(12) United States Patent
Tetsuka et al.

(10) Patent No.: US 9,216,686 B2
(45) Date of Patent: Dec. 22, 2015

(54) VEHICLE LIGHTING CONTROL SYSTEM

(75) Inventors: Takashi Tetsuka, Niiza (JP); Hajime Soda, Asaka (JP); Nobuyuki Takenaka, Iruma (JP); Kenichi Shiratori, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 14/007,088

(22) PCT Filed: Mar. 9, 2012

(86) PCT No.: PCT/JP2012/056055
§ 371 (c)(1),
(2), (4) Date: Sep. 24, 2013

(87) PCT Pub. No.: WO2012/132830
PCT Pub. Date: Oct. 4, 2012

(65) Prior Publication Data
US 2014/0015409 A1    Jan. 16, 2014

(30) Foreign Application Priority Data
Mar. 31, 2011    (JP) ................................ 2011-081224

(51) Int. Cl.
*B60Q 1/34*    (2006.01)
*B60Q 1/26*    (2006.01)
*B60Q 1/38*    (2006.01)
*B60Q 1/46*    (2006.01)
*B62J 6/00*    (2006.01)
*B60Q 1/52*    (2006.01)
*B60Q 7/00*    (2006.01)

(52) U.S. Cl.
CPC .. *B60Q 1/26* (2013.01); *B60Q 1/38* (2013.01); *B60Q 1/46* (2013.01); *B62J 6/00* (2013.01); *B62J 6/005* (2013.01); *B60Q 1/34* (2013.01); *B60Q 1/52* (2013.01); *B60Q 7/00* (2013.01)

(58) Field of Classification Search
None
See application file for complete search history.

(56) References Cited

U.S. PATENT DOCUMENTS

| | | | |
|---|---|---|---|
| 2002/0047531 A1* | 4/2002 | Sugimoto et al. | 315/82 |
| 2003/0222776 A1 | 12/2003 | Wakabayashi et al. | |
| 2004/0095234 A1* | 5/2004 | Sugimoto et al. | 340/475 |
| 2006/0091817 A1* | 5/2006 | Herrig et al. | 315/200 A |
| 2007/0096893 A1 | 5/2007 | Kondo | |
| 2008/0150708 A1 | 6/2008 | Takeuchi et al. | |
| 2013/0147377 A1* | 6/2013 | Kubota et al. | 315/201 |
| 2014/0015665 A1* | 1/2014 | Yamaguchi | 340/475 |
| 2014/0016336 A1* | 1/2014 | Takenaka et al. | 362/473 |
| 2014/0232283 A1* | 8/2014 | Ohki | 315/210 |
| 2014/0232285 A1* | 8/2014 | Ohki | 315/210 |

FOREIGN PATENT DOCUMENTS

| | | |
|---|---|---|
| JP | 63-164677 U | 10/1988 |
| JP | 11-263164 A | 9/1999 |

(Continued)

*Primary Examiner* — Tuan T Lam
(74) *Attorney, Agent, or Firm* — Carrier Blackman & Associates, P.C.; Joseph P. Carrier; Anne G. Sabourin

(57) ABSTRACT

A lighting control system is provided with a blinker switch, a hazard switch, and a control circuit which controls the flashing of blinker lamps. The CPU of the control circuit, after detecting an input signal from one switch input port among a left side and a right side switch input port, determines that the hazard switch is switched on when an input signal from the other of the switch input ports is detected within a predetermined time, and determines that the blinker switch is switched on when no input signal from the other of the switch input ports is detected.

6 Claims, 10 Drawing Sheets

(56) References Cited

FOREIGN PATENT DOCUMENTS

| JP | 2002-101075 A | 4/2002 |
| JP | 2003-127928 A | 5/2003 |
| JP | 2004-009805 A | 1/2004 |
| JP | 2006-123741 A | 5/2006 |
| JP | 2006-143163 A | 6/2006 |
| JP | 2007-125901 A | 5/2007 |
| JP | 2008-155858 A | 7/2008 |

* cited by examiner

FIG. 4

| SYSTEM STATES | TCS-ON INDICATOR | TCS-OFF INDICATOR |
|---|---|---|
| 2 SECONDS LATER AFTER IGNITION SWITCH IS TURNED ON | TC ENERGIZED | TC ENERGIZED |
| UPON INITIAL DIAGNOSIS PROCESS | TC ENERGIZED | DE-ENERGIZED |
| IN NORMAL DRIVING MODE | DE-ENERGIZED | DE-ENERGIZED |
| DURING TCS OPERATION | TC BLINKING | DE-ENERGIZED |
| WHEN TCS IS TURNED OFF | DE-ENERGIZED | TC ENERGIZED |
| UPON TCS FAILURE | TC ENERGIZED | DE-ENERGIZED |

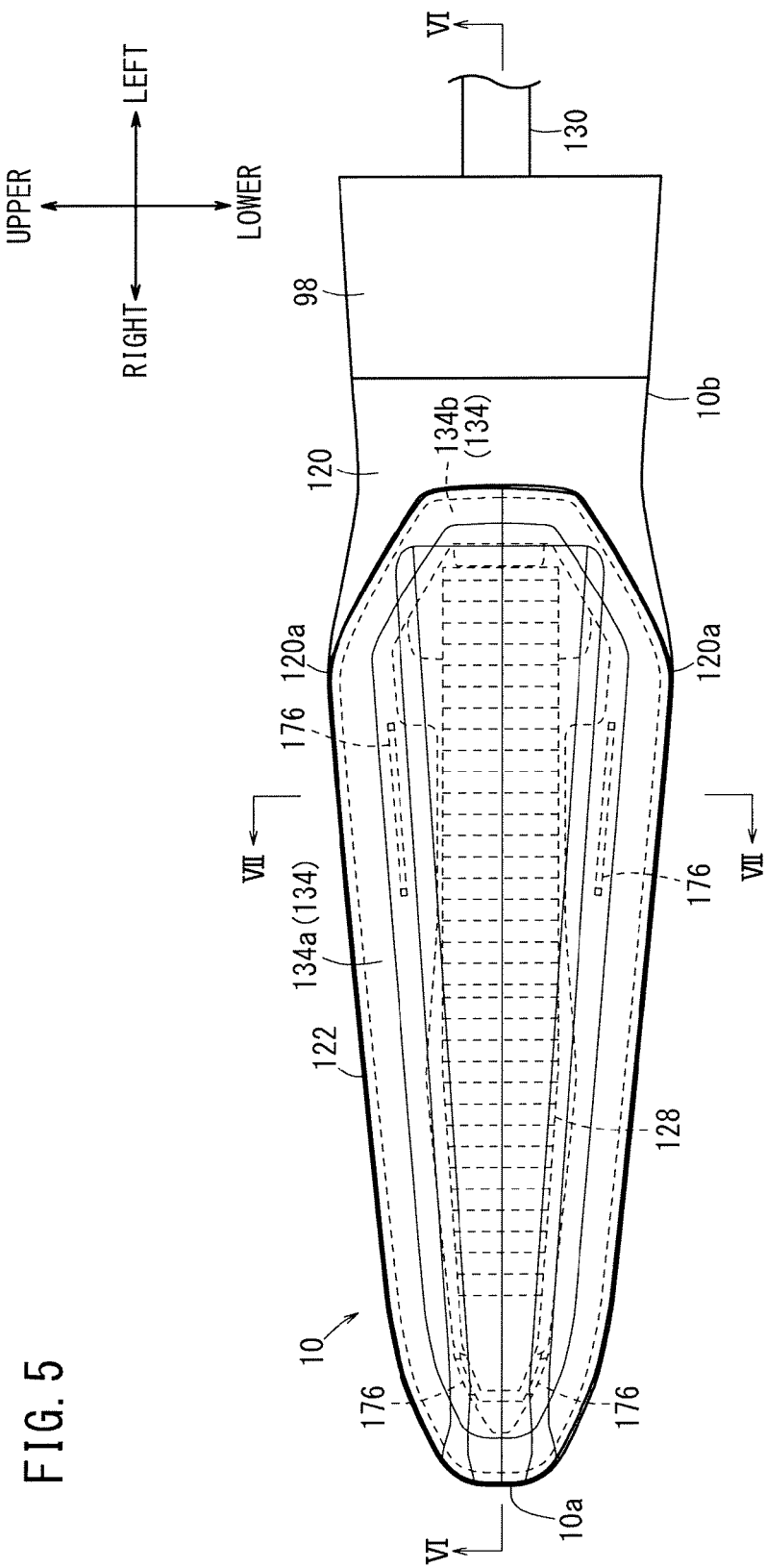

VEHICLE LIGHTING CONTROL SYSTEM

TECHNICAL FIELD

The present invention relates to a vehicular lighting control system (vehicle lighting control system) for blinking left and right lamps of a vehicle in a winker mode and a hazard mode.

BACKGROUND ART

Japanese Laid-Open Patent Publication No. 2003-127928 discloses a circuit structure including a flasher switch (winker switch) and a hazard switch, which are connected between a flasher controller (controller) and ground. The winker switch and the hazard switch are connected in parallel. Since the winker switch and the hazard switch are connected in parallel, they can be connected to the controller using the same wires (harnesses), thereby reducing the number of harnesses.

In recent years, lighting devices (lighting bodies) including light-emitting diodes (hereinafter also referred to as "LEDs") as light sources have been developed for device downsizing and reduced power consumption. If a winker switch and a hazard switch are connected in parallel between a controller and ground in combination with an LED lighting body that can be energized with a low current, as disclosed in Japanese Laid-Open Patent Publication No. 2003-127928, then when a leakage current flows in the winker switch and/or the hazard switch, the LED may possibly be turned on erroneously by the leakage current.

For the above reasons, it has been desirable for a lighting control system on a vehicle to control a lighting body to blink only after the lighting control system has determined that the driver of the vehicle has turned on a winker switch or a hazard switch. One circuit arrangement proposed for such a lighting control system includes a winker switch and a hazard switch, which are connected as high-side switches between a controller and a power supply. The controller determines that the winker switch and the hazard switch have been turned on by detecting an input voltage, which is applied from the power supply when the switches are turned on.

SUMMARY OF INVENTION

However, if the winker switch and the hazard switch are connected in parallel and are connected to the controller by common wires, as disclosed in Japanese Laid-Open Patent Publication No. 2003-127928, then a mechanical action of the hazard switch may possibly generate asynchronous input voltages on two respective wires for a right lighting body and a left lighting body, which are connected to the controller. When asynchronous input voltages are applied to the controller, the controller is unable to accurately distinguish between turning-on of the hazard switch and turning-on of the winker switch.

It is an object of the present invention to provide a vehicular lighting control system, which prevents lighting bodies that include light-emitting diodes as light sources from being energized in error by a leak current, and which accurately discriminates between turning-on of a winker switch and turning-on of a hazard switch, while also reducing the number of harnesses used.

According to claim 1 of the present invention, there is provided a lighting control system for use on a vehicle, comprising a winker switch and a hazard switch which can be turned on and off selectively by a driver of the vehicle, and a controller, which operates in a winker mode for blinking either left or right lighting bodies having light-emitting diodes mounted on left and right sides of the vehicle, when the winker switch is turned on, and a hazard mode for blinking the left and right lighting bodies simultaneously when the hazard switch is turned on. The controller comprises a left switch input port for supplying signals representative of operation of the left lighting bodies, and a right switch input port for supplying signals representative of operation of the right lighting bodies, the winker switch and the hazard switch being connected through common wires to the left switch input port and the right switch input port, and judging means for determining an input signal supplied from the left switch input port and an input signal supplied from the right switch input port when the winker switch is turned on or when the hazard switch is turned on. The judging means determines that the hazard switch has been turned on if the judging means detects an input signal from either one of the left switch input port and the right switch input port and then, within a prescribed time, detects an input signal from the other of the left switch input port and the right switch input port, and further determines that the winker switch has been turned on if the judging means does not detect, within the prescribed time, an input signal from the other of the left switch input port and the right switch input port.

According to claim 2 of the present invention, in the lighting control system according to claim 1, the vehicle comprises a power supply, and the winker switch and the hazard switch are connected in parallel between the controller and the power supply.

According to claim 3 of the present invention, in the lighting control system according to claim 2, the hazard switch comprises a three-contact switch, three contacts of which are connected to the left switch input port, the right switch input port, and the power supply, respectively, when the hazard switch is turned on.

According to claim 4 of the present invention, in the lighting control system according to claim 1, the controller switches from the winker mode to the hazard mode when the judging means determines that the hazard switch has been turned on during the winker mode.

According to claim 5 of the present invention, in the lighting control system according to claim 1, the judging means determines that the winker switch and the hazard switch are not turned on until the prescribed time has elapsed.

According to claim 6 of the present invention, in the lighting control system according to claim 1, the controller includes a holder for continuously supplying electric power, to thereby perform the hazard mode until the hazard switch has been turned off, even if an ignition switch for operating an engine of the vehicle is turned off during the hazard mode. The holder stops supplying electric power until the ignition switch, which has been turned off, is turned on again after the hazard switch has been turned off.

According to claim 7 of the present invention, in the lighting control system according to claim 1, the controller includes a voltage determiner for determining a voltage applied when the winker switch or the hazard switch is turned on, and for determining a voltage generated due to a leakage current, the voltage determiner being connected between the left switch input port and the right switch input port, and the judging means.

According to claim 8 of the present invention, in the lighting control system according to claim 1, the vehicle comprises a motorcycle having a front wheel steerable by a handle assembly, and the winker switch and the hazard switch are disposed proximate to the handle assembly.

In the invention according to claim 1, the judging means determines that the hazard switch has been turned on if the judging means detects an input signal from either one of the left switch input port and the right switch input port and then, within a prescribed time, detects an input signal from the other of the left switch input port and the right switch input port. Therefore, when the hazard switch is turned on, even if the hazard switch applies input signals at different times to the controller due to pressing of a mechanical pushbutton, for example, of the hazard switch, the controller can detect an earlier input signal, and then can detect another input signal within a prescribed time from the earlier input signal, thereby determining that the hazard switch has been turned on. If the controller does not detect an input signal from the other switch input port within the prescribed time from the earlier input signal, then the controller determines that the winker switch has been turned on. Consequently, the controller can accurately distinguish between turning-on of the winker switch and turning-on of the hazard switch. The lighting bodies are effectively prevented from being energized in error as a result of a leakage current, and the winker switch and the hazard switch are of a relatively simple circuit arrangement since the winker switch and the hazard switch are connected by common wires, thereby resulting in a reduced number of harnesses required to interconnect the switches and the controller.

In the invention according to claim 2, since the winker switch and the hazard switch are connected between the controller and the power supply, signals that are generated when the winker switch and the hazard switch are turned on are applied to the controller based on the voltage applied from the power supply.

In the invention according to claim 3, inasmuch as the hazard switch is a three-contact switch, the hazard switch may be a simple and inexpensive pushbutton switch. Further, the controller can accurately determine that such a switch has been turned on.

In the invention according to claim 4, since the controller switches from the winker mode to the hazard mode when the judging means determines that the hazard switch has been turned on during the winker mode, the controller can switch from blinking of the lighting bodies in the winker mode for indicating a turning direction of the vehicle to blinking of the lighting bodies in the hazard mode, which is more urgent than blinking of the lighting bodies in the winker mode.

In the invention according to claim 5, since the judging means determines that the winker switch and the hazard switch are not turned on until the prescribed time has elapsed, the judging means can energize the lighting bodies after having accurately judged the existence of input signals from the winker switch and the hazard switch, thereby preventing the lighting bodies from being energized in error.

In the invention according to claim 6, the holder continuously supplies electric power thereby to perform the hazard mode until the hazard switch has been turned off, even if the ignition switch for operating the engine of the vehicle is turned off during the hazard mode. Therefore, the hazard mode can be performed when the engine is stopped, thus making the vehicle highly visible. After the hazard switch has been turned off, the holder stops supplying electric power until the ignition switch is turned on again. Therefore, the lighting bodies are prevented from being energized in the hazard mode when the hazard switch is turned on by a third party, for example.

In the invention according to claim 7, the voltage determiner determines a voltage applied when the winker switch or the hazard switch is turned on, and also determines a voltage generated due to a leakage current. Therefore, the controller can block the leakage current, which may be generated from the winker switch or the hazard switch, and thus can accurately determine if the winker switch or the hazard switch has been turned on.

In the invention according to claim 8, since the winker switch and the hazard switch are disposed proximate to the handle assembly, the driver of the vehicle can easily turn the winker switch and the hazard switch on and off. Even if a leakage current is generated from the winker switch and the hazard switch, for example, due to rainwater applied thereto, the leakage current is effectively blocked by the controller.

BRIEF DESCRIPTION OF DRAWINGS

FIG. 4 is a table showing turned-on and turned-off states of an ON-indicator and an OFF-indicator of a TCS (Traction Control System) shown in FIG. 3;

FIG. 5 is an enlarged front elevational view of a winker lamp shown in FIG. 2;

DESCRIPTION OF EMBODIMENTS

A vehicular lighting control system according to a preferred embodiment of the present invention will be described in detail below with reference to the accompanying drawings.

Figure 1:
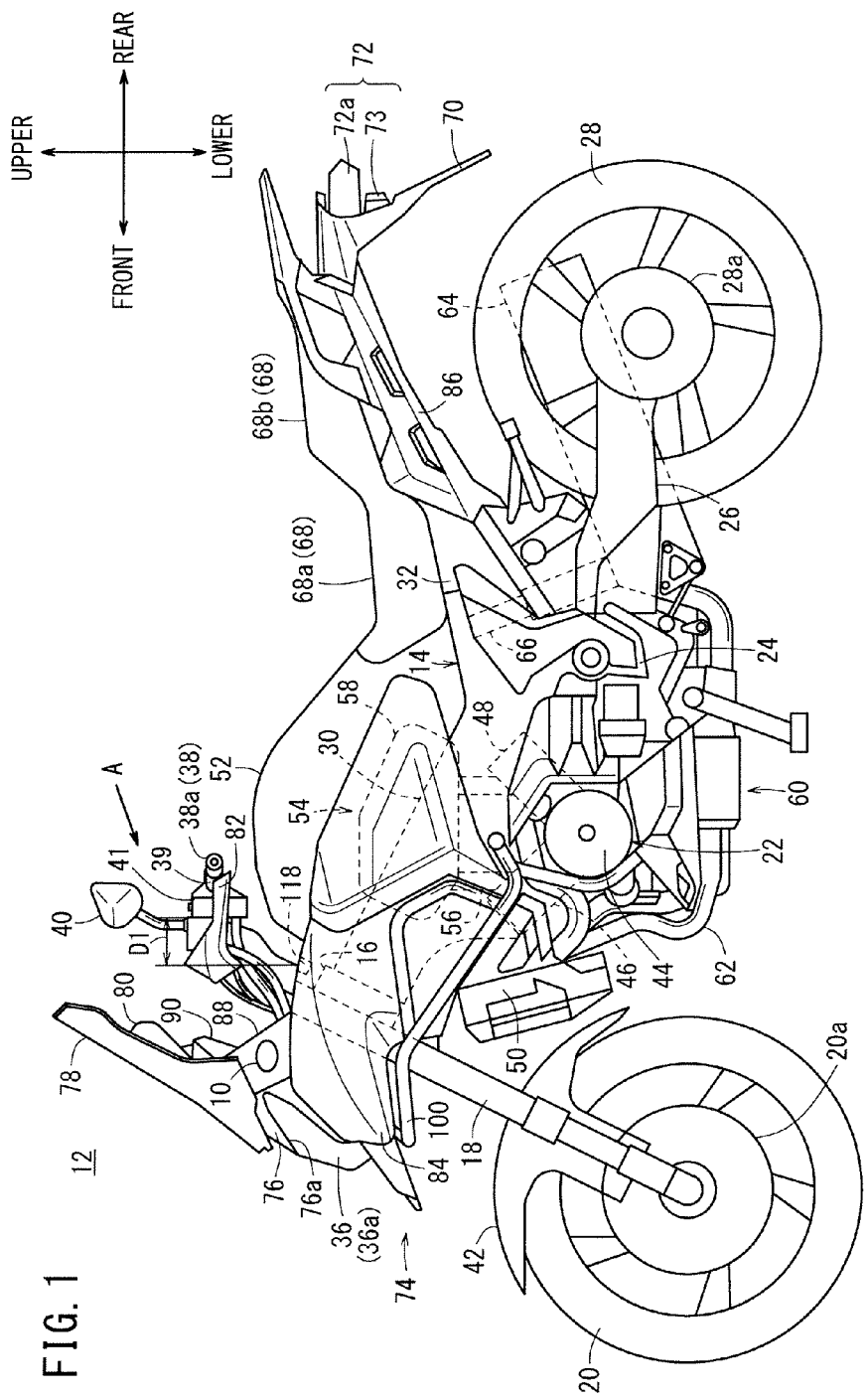
FIG. 1 is a schematic side elevational view of a saddle-type motorcycle incorporating a vehicular lighting control system according to an embodiment of the present invention.

FIG. 1 is a schematic side elevational view of a saddle-type motorcycle (hereinafter also referred to as a "motorcycle") 12, which incorporates therein a vehicular lighting control system 11 according to an embodiment of the present invention. The present invention will hereinafter be described in detail below as applied to a saddle-type motorcycle. However, the principles of the present invention are not limited to a saddle-type motorcycle, but also are applicable to any of various other land vehicles, including other types of powered two-wheeled vehicles, motor-assisted bicycles, and powered four-wheeled vehicles. For easier understanding of the present invention, forward, rearward, upward, and downward directions will be described with respect to the directions indicated by the arrows in FIG. 1. Leftward and rightward directions (see the leftward and rightward directions indicated by the arrows in FIG. 2) will be described with respect to directions as viewed by the rider seated on the saddle-type motorcycle 12.

As shown in FIG. 1, the motorcycle 12 includes a vehicle frame 14 as a vehicle body, a pair of left and right front fork members 18 rotatably supported by a head pipe 16 on the front end of the vehicle frame 14, a front wheel (steerable wheel) 20 mounted on the front fork members 18, an engine 22 supported on the vehicle frame 14, which serves as a drive source for the motorcycle 12, a swing arm 26 swingably supported on a lower pivot 24 of the vehicle frame 14, and a rear wheel (drive wheel) 28 mounted on the rear end of the swing arm 26.

The vehicle frame 14 comprises a highly rigid tube frame, which is cast of aluminum. The vehicle frame 14 includes a pair of left and right main frames 30 that branch leftward and rightward from the head pipe 16, and which extend obliquely rearward and downward therefrom, the pivot 24 joined to rear portions of the main frames 30 and extending downwardly therefrom, and a pair of left and right seat frames 32 mounted on a rear portion of the main frames 30 and extending obliquely rearward and upwardly therefrom. The vehicle frame 14 comprises a structure constructed from a reduced number of frame components and which is capable of supporting mechanisms within the vehicle body.

The front fork members 18 extend substantially vertically on a front portion of the vehicle body. A top bridge 34 (see FIG. 3) is mounted on upper portions of the front fork members 18. A headlight 36 for illuminating an area in front of the vehicle body is disposed on upper portions of the front fork members 18. A handle assembly 38 for steering the front wheel 20 is mounted on the top bridge 34. The handle assembly 38 includes a pair of left and right handlebars 39 that extend outward symmetrically to the left and right transversely to the vehicle body, and grips 38a mounted respectively on left and right ends of the handlebars 39. A pair of left and right rearview mirrors 40 are mounted on respective portions of the handlebars 39.

The front wheel 20 is rotatably supported on lower ends of the front fork members 18. A brake device 20a in the form of a disk brake is mounted on one side of the front wheel 20. The front wheel 20 has an upper portion covered with a front fender 42, which is attached to lower portions of the front fork members 18 above the front wheel 20.

The engine 22 comprises a water-cooled, four-stroke V-shaped four-cylinder engine. The engine 22 includes a crankcase 44 disposed on a lower portion thereof, a front cylinder 46 extending obliquely forward and upwardly from the crankcase 44, and a rear cylinder 48 extending in a rearward direction obliquely from the crankcase 44 behind the front cylinder 46. The engine 22 has an intermediate portion disposed between the front cylinder 46 and the rear cylinder 48, which is fixed to and supported by the main frames 30, and a portion disposed behind the rear cylinder 48, which is fixed to and supported by the pivot 24, so that the engine 22 is disposed in a fixed posture with respect to the main frames 30.

Each of the front cylinder 46 and the rear cylinder 48 houses therein an ignition plug for igniting an air-fuel mixture therein, and a piston for compressing the air-fuel mixture, neither of which is shown. A crankshaft and an engine output shaft (not shown), which are operatively connected to the pistons by connecting rods, are rotatably supported in the crankcase 44. The engine 22 is combined with a dual clutch transmission, which includes two clutches that can be switched into operation for allowing the motorcycle 12 to travel selectively in two travel modes, e.g., an automatic mode and a manual mode. When the engine 22 is in operation, rotational drive power is produced, which is transmitted by a drive shaft (not shown) extending rearwardly from the crankcase 44 to the rear wheel 28.

A radiator 50 for radiating heat from the engine 22 is disposed in front of the front cylinder 46. A fuel tank 52 and an intake unit 54 are disposed above the engine 22. The intake unit 54 includes a throttle body 56 connected to respective inner upper portions of the front cylinder 46 and the rear cylinder 48, and an air cleaner 58 connected to an upstream end of the throttle body 56 by a non-illustrated intake pipe. The throttle body 56 incorporates a TBW (Throttle By Wire) system for changing the opening of a throttle valve disposed therein via an actuator. The intake unit 54 introduces air through the air cleaner 58, which removes dust and dirt and injects cleaned air together with fuel from the throttle body 56 into the front cylinder 46 and the rear cylinder 48.

The engine 22 is disposed above an exhaust assembly 60. The exhaust assembly 60 includes exhaust tubes 62 extending below the crankcase 44 and connected respectively to a front portion of the front cylinder 46 and a rear portion of the rear cylinder 48, and an exhaust muffler 64 connected to the exhaust tubes 62 and disposed on the right-hand side of the rear wheel 28. The exhaust assembly 60 serves to discharge exhaust gases from the engine 22 through the exhaust tubes 62 and the exhaust muffler 64.

The swing arm 26 extends substantially horizontally rearward from the pivot 24, and the rear wheel 28 is rotatably supported on the rear end of the swing arm 26. A brake device 28a in the form of a disk brake is mounted on one side of the rear wheel 28. A rear cushion 66, which resiliently connects the main frames 30 and the swing arm 26 to each other, is disposed upwardly of a front portion of the swing arm 26. The rear cushion 66 serves to absorb vibrations generated when the motorcycle 12 travels.

A seat 68 for passengers (a rider and a pillion passenger) to be seated thereon is disposed on the seat frames 32. The seat 68 is of a tandem structure including a front seat 68a for the rider to sit on, and a rear seat 68b for the pillion passenger to sit on behind the front seat 68a. A rear fender 70 is attached to rear portions of the seat frames 32. The rear fender 70 extends horizontally rearward from the seat frames 32 and includes a rear portion extending obliquely downward. The rear fender 70 supports thereon a tail lamp unit 72 as an illuminating unit on a rear portion of the vehicle body. The tail lamp unit 72 includes a brake lamp 72a and a pair of left and right rear winker lamps 73. The tail lamp unit 72 energizes and de-energizes the brake lamp 72a and the rear winker lamps 73 based on actions made by the rider.

The motorcycle 12 includes a vehicle body cover 74 providing a design surface (appearance) of the vehicle body along the longitudinal direction thereof. The vehicle body cover 74 is made of a polymeric material such as acrylonitrile butadiene styrene (ABS), fiber-reinforced plastics (FRP), polypropylene (PP), or the like.

The vehicle body cover 74 includes a headlight cover 76 covering the peripheral surface of the headlight 36, a screen support cover 80 supporting a screen 78 above the headlight 36, handle covers 82 covering front portions of the handle assembly 38, a pair of left and right side cowls 84 extending rearwardly from respective opposite sides of the headlight 36, and a rear cowl 86 extending obliquely rearward and upwardly along the seat frames 32 to cover opposite side surfaces of the seat frames 32.

The vehicle body cover 74 also includes a cowl support stay 88 supporting the headlight 36 and the screen support cover 80. The cowl support stay 88 is fixed to front portions of the main frames 30. The cowl support stay 88 supports thereon a meter unit 90, which is disposed behind the headlight 36, and also supports a pair of left and right front winker lamps 10 on respective opposite side surfaces thereof.

Figure 2:
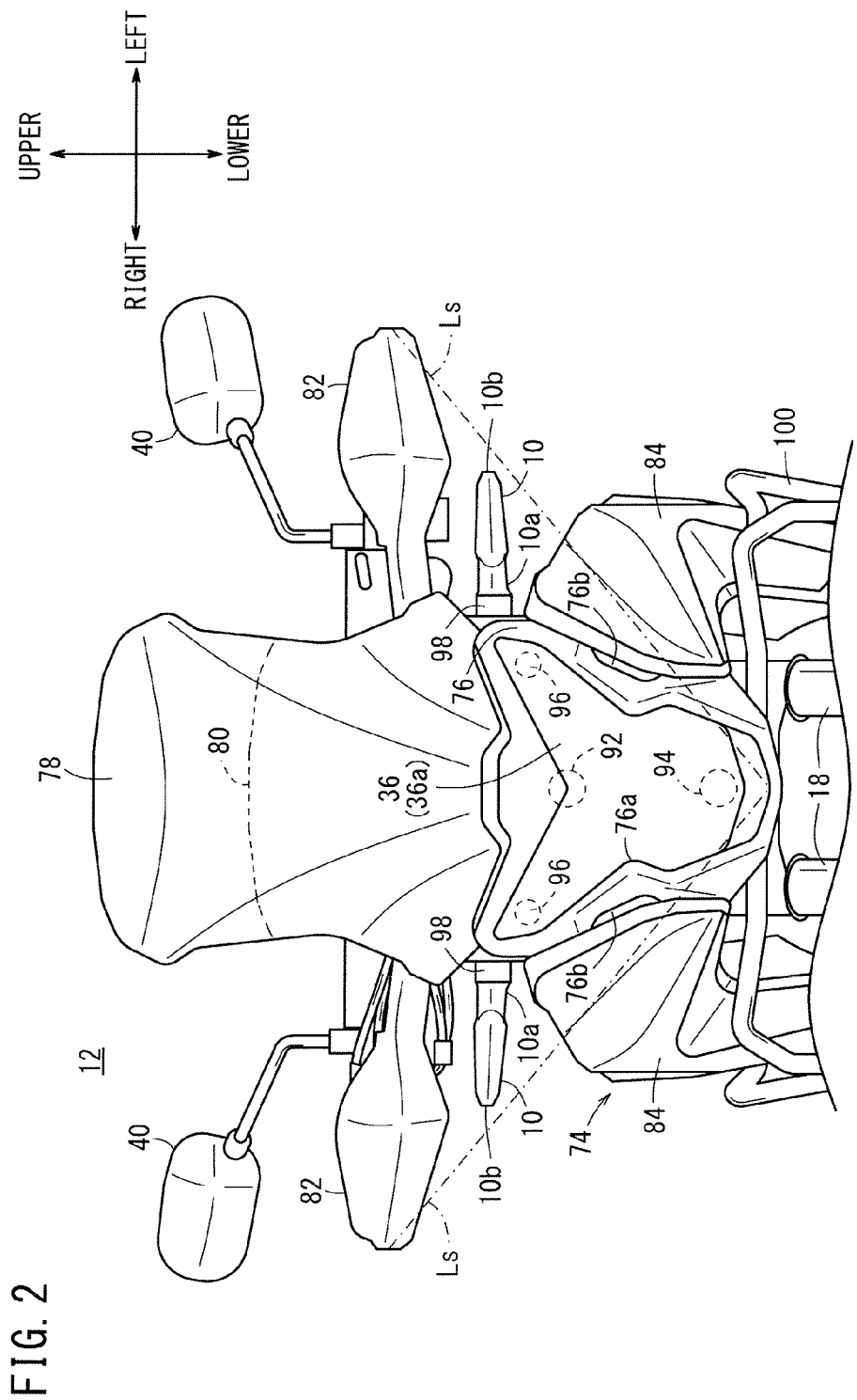
FIG. 2 is an enlarged fragmentary front elevational view of a front upper portion of the motorcycle shown in FIG. 1.

FIG. 2 is an enlarged fragmentary front elevational view of a front upper portion of the motorcycle 12 shown in FIG. 1. As shown in FIG. 2, the headlight cover 76 and the screen 78 (screen support cover 80) provide a design surface of a front upper portion of the vehicle body. The design surface is of a streamlined shape gradually inclined rearwardly from a front central portion in the transverse direction and in the upward direction.

The headlight cover 76 has opposite side surfaces covered with the side cowls 84, providing a substantially triangular design surface, which has vertices defined at upper left and right ends and at a lower central end as viewed in front elevation. The headlight cover 76 has an opening 76a defined therein, which is shaped to allow a lens surface 36a of the headlight 36 to be seen as a substantially heart shape. The headlight cover 76 also has recesses 76b defined respectively in left and right surfaces thereof. The recesses 76b and confronting edges of the side cowls 84, which extend therealong, jointly define apertures that open into the vehicle body cover 74. The apertures serve to guide ram air toward the air cleaner 58 when the motorcycle 12 is driven.

The headlight 36 is housed in the headlight cover 76 with the lens surface 36a exposed in a forward direction. The headlight 36 includes a low-beam bulb 92 disposed in a central upper position thereof, and a high-beam bulb 94 disposed in a central lower position thereof. The headlight 36 also includes a pair of left and right positioning light bulbs 96 disposed in respective transverse outer positions.

The front winker lamps 10 have respective proximal ends 10a mounted on the cowl support stay 88 (see FIG. 1) by attachments 98, and which extend substantially horizontally outward along the transverse direction of the vehicle body. The front winker lamps 10 have respective transverse outer ends 10b that project outwardly, but terminate short of line segments Ls, which extend between the lower end of the opening 76a of the headlight cover 76 and the transverse outer ends of the handle covers 82. When the upper portion of the vehicle body is viewed in front elevation, the handle covers 82, the front winker lamps 10, and the headlight cover 76 jointly define a design surface, which spreads transversely outward for better appearance in a well balanced fashion along an upward direction from the central area of a front portion of the headlight cover 76.

Furthermore, when the upper portion of the vehicle body is viewed in front elevation, the winker lamps 10 are spaced obliquely laterally from the positioning light bulbs 96 of the headlight 36. The winker lamps 10 blink to produce direction indicating signals while the motorcycle 12 is being driven. In addition, at the same time that the positioning light bulbs 96 are energized, the winker lamps 10 are energized to emit a smaller amount of light than when the winker lamps 10 blink to produce the direction indicating signals. Accordingly, the winker lamps 10 also serve as positioning lights, i.e., auxiliary lights. More specifically, a total of four lights, i.e., the two left and right positioning light bulbs 96 and the two left and right winker lamps 10, are simultaneously energized to make the motorcycle 12 highly visible to oncoming vehicles.

As shown in FIGS. 1 and 2, the vehicle body cover 74 includes cowl guard pipes 100 extending from respective left and right main frames 30 forwardly along the side cowls 84, and which are connected to a lower portion of the headlight cover 76. The cowl guard pipes 100 provide a design surface on the front portion of the vehicle body, and also serve to prevent the vehicle body cover 74 from being damaged when the motorcycle 12 overturns.

Figure 3:
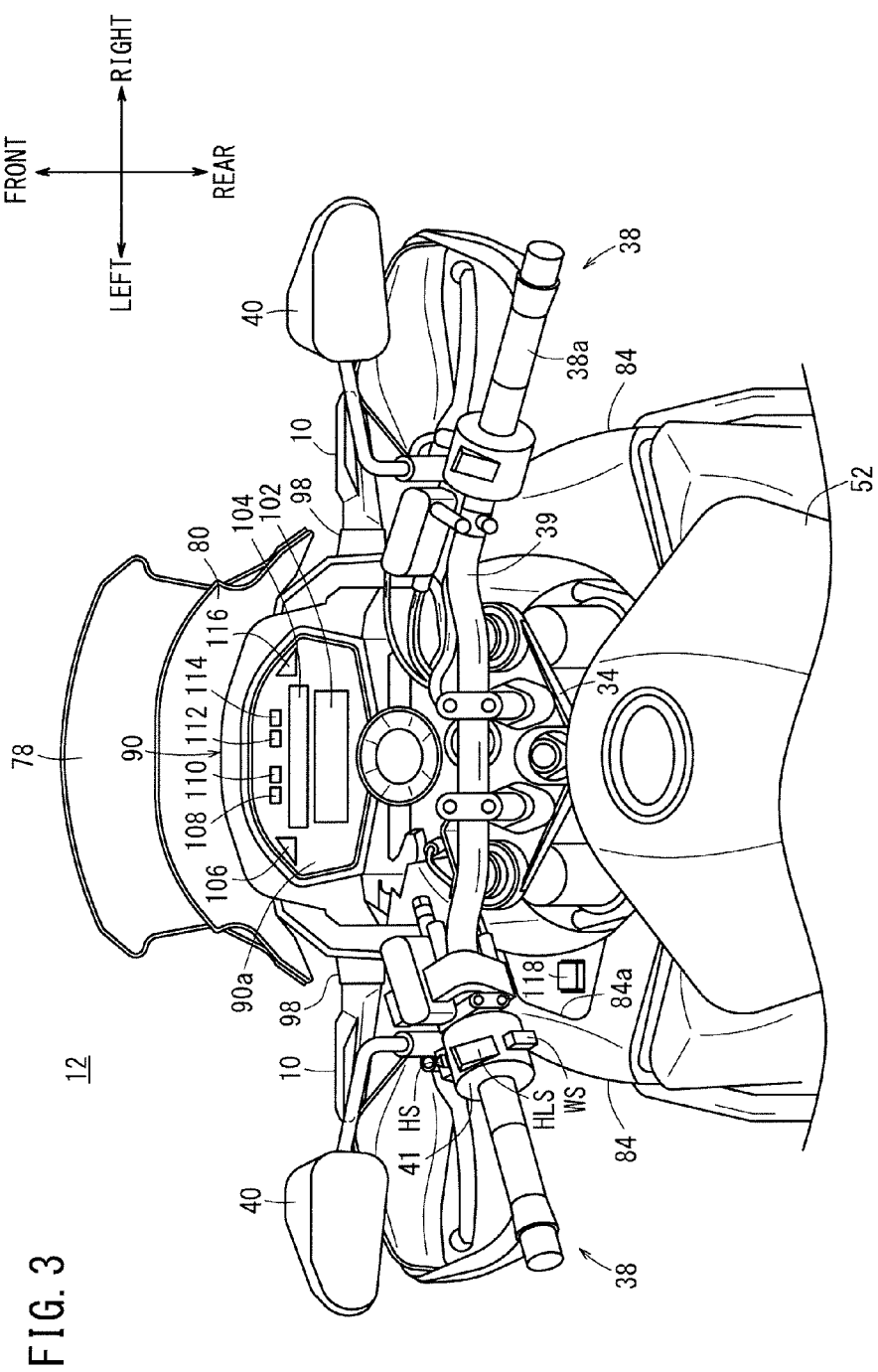
FIG. 3 is a view of a portion of the motorcycle shown in FIG. 1, as viewed in a direction indicated by the arrow A in FIG. 1.

FIG. 3 is a view of a portion of the motorcycle 12 shown in FIG. 1, as viewed in the direction indicated by the arrow A in FIG. 1. As shown in FIG. 3, a handle switch case 41 of a switch unit 208 (see FIG. 8) is mounted on the left handlebar 39 of the motorcycle 12. The handle switch case 41 supports on a surface thereof a hazard switch HS for controlling hazard blinking (hazard mode), a headlight beam switch HLS for switching between high beam and low beam modes emitted from the headlight 36, and a winker switch WS for controlling winker blinking (winker mode), arranged successively in this order along the rearward direction. Since the hazard switch HS, the headlight beam switch HLS, and the winker switch WS are positioned proximate to the handle assembly 38, the rider can easily turn on and off such switches while manipulating the handle assembly 38.

According to the present embodiment, the meter unit 90 of the motorcycle 12 displays digital representations of the speed of the motorcycle 12 and the rotational speed of the engine 22 while the motorcycle 12 is being driven. The meter unit 90 is supported on the cowl support stay 88 behind the headlight 36 (see FIG. 1).

The meter unit 90 includes a speedometer liquid crystal screen 102 for displaying the speed of the motorcycle 12, and a tachometer liquid crystal screen 104 for displaying the rotational speed of the engine 22. The speedometer liquid crystal screen 102 and the tachometer liquid crystal screen 104 are disposed on a surface of the meter unit 90, which is positioned forwardly of the handle assembly 38 and faces toward the rider sitting on the seat 68. The meter unit 90 also includes a plurality of indicators or display lamps disposed in an upper area of the surface thereof for indicating various states of a driving system and an electrical system of the motorcycle 12. More specifically, such indicators include a left winker indicator 106, a high beam indicator 108, a neutral indicator 110, an ON-indicator 112 and an OFF-indicator 114 of a TCS (Traction Control System), and a right winker indicator 116, arranged successively in this order from left to right as viewed by the rider. The left winker indicator 106 and the right winker indicator 116 are turned on when the front winker lamps 10 and the rear winker lamps 73 blink to indicate directions in which the motorcycle 12 is turned. The high beam indicator 108 is turned on when the high-beam bulb 94 of the headlight 36 is turned on to emit high-beam light. The neutral indicator 110 is turned on when the clutch of the motorcycle 12 is in a neutral position. The ON-indicator 112 and the OFF-indicator 114 are turned on based on states of the TCS.

TCS refers to a system for calculating a slip ratio based on vehicle speed signals from the front wheel 20 and the rear wheel 28 while the motorcycle 12 is driven, and for controlling operation of the motorcycle 12 based on the calculated slip ratio. For example, if the TCS decides that the rear wheel 28 is slipping based on the calculated slip ratio, then the TCS adjusts the throttle (TH) opening with the TBW system of the throttle body 56, in order to control the rate of the air-fuel mixture that is introduced into the front and rear cylinders 46, 48 so as to achieve a preset target slip ratio. The rotational speed of the engine 22, and hence the rotational speed of the rear wheel 28, are controlled to prevent the rear wheel 28 from slipping.

The TCS can be manually switched between an ON (controlling) state and an OFF (non-controlling) state by the rider, using a selector button 118 disposed in a recess 84a defined in an upper surface of the left side cowl 84. The selector button 118 is disposed at a position, which is spaced forwardly by a certain distance D1 (see FIG. 1) from the handle switch case 41 mounted on the handle assembly 38. Since the selector button 118 is spaced from the handle assembly 38, the selector button 118 is not inadvertently touched by the rider while driving the motorcycle 12. However, the selector button 118 can be reached by the rider only when the rider intends to operate the selector button 118. The rider can switch the TCS from the ON state to the OFF state by pressing the selector button 118 continuously for a long time, and can switch the TCS from the OFF state back to the ON state by pressing the selector button 118 again continuously for a long time. The TCS may remain in the OFF state continuously until the ignition switch, i.e., the engine 22, of the motorcycle 12 has been turned off. The TCS may automatically be returned to the ON state when the ignition switch is turned on again.

FIG. 4 is a table showing turned-on and turned-off states of the ON-indicator 112 and the OFF-indicator 114 of the TCS shown in FIG. 3. The ON-indicator 112 and the OFF-indicator 114 display states of the TCS based on combinations of two states thereof, i.e., turned-on and turned-off states. When the ignition switch is initially turned on, both the ON-indicator 112 and the OFF-indicator 114 are turned on for about 2 seconds, in order to inform the rider that the electrical system of the motorcycle 12 is energized.

Thereafter, the motorcycle 12 checks if the TCS is operating normally according to a self-diagnosis process (initial diagnosis process) before the motorcycle 12 is driven. At this time, the OFF-indicator 114 is turned off, and only the ON-indicator 112 is turned on. When the initial diagnosis process is finished, the ON-indicator 112 is turned off automatically.

When the motorcycle 12 is driven with the TCS in the ON (controlling) state, as long as the motorcycle 12 is driven normally, i.e., as long as the TCS determines that the rear wheel 28 is not slipping, both the ON-indicator 112 and the OFF-indicator 114 are turned off.

If the TCS decides that the rear wheel 28 is slipping, then the TCS controls the TBW system of the throttle body 56 as described above. While the TCS controls the TBW system, the ON-indicator 112 is controlled to blink, in order to inform the rider that the TCS is in operation.

If the rider presses the selector button 118 continuously for a long time in order to bring the TCS into an OFF (non-controlling) state when the motorcycle 12 is driven, then the OFF-indicator 114 is continuously turned on, in order to inform the rider that the TCS is not in operation.

If the TCS detects a failure (erroneous operation) according to a self-diagnosis process, then the ON-indicator 112 is turned on in order to inform the rider that the TCS is not working normally.

As described above, the motorcycle 12 lets the rider know the states of the TCS based on combinations of turned-on and turned-off states of the ON-indicator 112 and the OFF-indicator 114.

Structural details of the front winker lamps 10 will be described below with reference to FIGS. 5 through 7. Since the left and right front winker lamps 10 are symmetrical in structure, only the right winker lamp 10 as viewed from the position of the rider will be described in detail below, and detailed description of the left winker lamp 10 is omitted.

FIG. 5 is an enlarged front elevational view of the winker lamp 10 shown in FIG. 2. FIG. 6 is a cross-sectional view taken along line VI-VI of FIG. 5, and FIG. 7 is a cross-sectional view taken along line VII-VII of FIG. 5.

Figure 6:
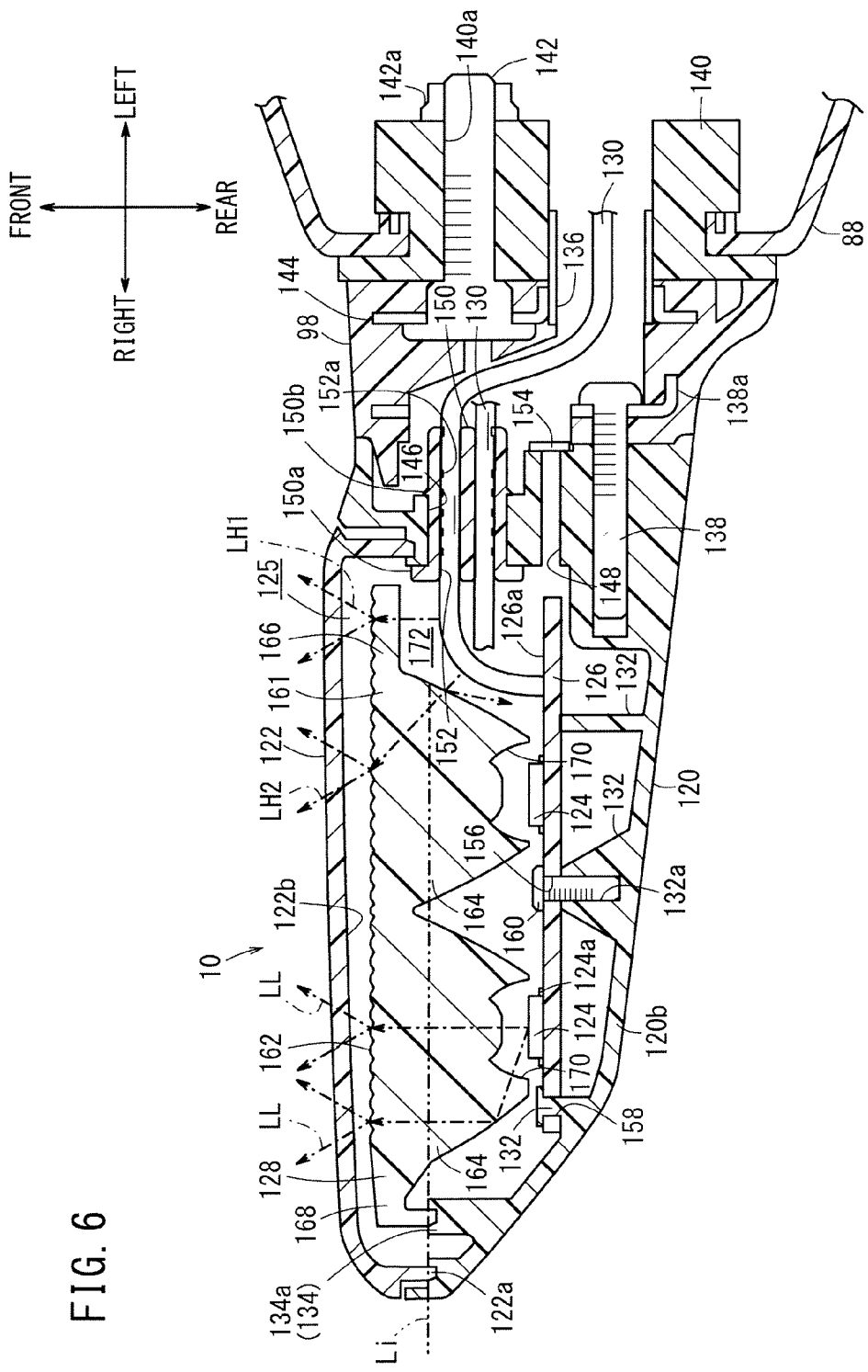
FIG. 6 is a cross-sectional view taken along line VI-VI of FIG. 5.

As shown in FIG. 6, the winker lamp 10 includes a base 120, an outer lens 122 mounted on a front side of the base 120, a board 126 with a plurality of light-emitting diodes (LEDs) 124 mounted thereon and housed in an inner space 125 defined between the base 120 and the outer lens 122, and an inner lens 128 disposed between the outer lens 122 and the board 126. The winker lamp 10 also includes a harness 130, which is connected to a mounting surface 126a of the board 126 with the LEDs 124 mounted thereon. The harness 130 includes wires electrically connected to the LEDs 124.

As shown in FIG. 5, the base 120 has a proximal end, which is mounted on the attachment 98. The base 120 has an outer profile, which grows gradually wider vertically in a direction away from the proximal end toward a widest portion 120a near the proximal end, and then becomes gradually narrower from the widest portion 120a toward a vertically central point. As shown in FIGS. 6 and 7, the base 120 has a substantially concave or cup-like cross-sectional shape with the board 126 housed therein.

As shown in FIG. 6, the base 120 has a plurality (three in FIG. 6) of protrusive rests 132 projecting forwardly from a rear wall 120b, which serves as the bottom of the concave cross-sectional shape. The protrusive rests 132 support the board 126 thereon in spaced relationship to the rear wall 120b. Therefore, heat generated by the LEDs 124 when the LEDs 124 are energized to emit light is dissipated or radiated into the air surrounding the board 126.

The base 120 is molded from a synthetic resin, which is capable of withstanding the heat generated by the LEDs 124 when the LEDs 124 emit light. For example, a BMC (Bulk Molding Compound) resin may be used as the synthetic resin.

As shown in FIG. 5, the base 120 has a front mounting surface 134 on which the outer lens 122 and the inner lens 128 are mounted. The front mounting surface 134 includes a flat area (flat surface) 134a that extends from the widest portion 120a along a transverse outward direction of the motorcycle 12, and a slanted area 134b, which is slanted obliquely from the widest portion 120a along an opposite transverse inward direction of the motorcycle 12.

As shown in FIGS. 5 and 6, the proximal end of the base 120 is fastened to the attachment 98 by a mounting screw 138. The attachment 98 has a harness channel 136 defined therein, which extends in a crank shape from the proximal end thereof in the transverse outward direction of the motorcycle 12. The harness 130 is guided from the proximal end of the attachment 98 through the harness channel 136 to the base 120.

The mounting screw 138 is placed in the harness channel 136 and is threaded into the base 120 through a washer 138a and the attachment 98 in the transverse outward direction of the motorcycle 12, thereby fastening the base 120 to the attachment 98. The attachment 98 preferably is made from an elastic synthetic resin, such as synthetic rubber or the like. Since the attachment 98 is elastic, the attachment 98 can absorb vibrations caused when the motorcycle 12 is driven, and hence the attachment 98 is capable of supporting the winker lamp 10 stably.

A mounting bolt 142 includes a head, which is embedded in the proximal end of the attachment 98, and a tip end that extends in the transverse inward direction of the motorcycle 12. The mounting bolt 142, with the flange 144 mounted thereon, is embedded in the attachment 98 when the attachment 98 is molded. Therefore, the mounting bolt 142 is securely held in the attachment 98 and is prevented from being removed therefrom. The mounting bolt 142 extends through a support 140, which is mounted on the cowl support stay 88.

The support 140 is molded from a synthetic resin and is fitted into the cowl support stay 88. The mounting bolt 142 is inserted into a bolt insertion hole 140a defined in the support 140, and is secured to the support 140 by a nut 142a, which is threaded over the tip end of the mounting bolt 142. Thus, the winker lamp 10 is supported firmly on the cowl support stay 88 by the attachment 98 and the support 140.

The base 120 has two holes, i.e., a first hole 146 and a second hole 148, defined in an end wall to which the attachment 98 is mounted. The first hole 146 and the second hole 148 communicate with the inner space 125 defined between the base 120 and the outer lens 122, or more specifically, with a partial space 172, to be described later. The first hole 146 is larger in diameter than the second hole 148. A grommet 150, which serves as a harness holder, is inserted into the first hole 146, and holds the harness 130 therein.

The grommet 150 has an insertion hole 152 defined therein through which the harness 130 extends. The insertion hole 152 is defined by an inner circumferential surface of the grommet 150, which has a plurality of teeth 152a held in close contact with the outer circumferential surface of the harness 130. The grommet 150 has a flange 150a on one end thereof, which is disposed in the inner space 125. The flange 150a has a diameter, which is greater than the first hole 146 in the base 120. The grommet 150 also has a ridge 150b on the outer circumferential surface of an intermediate portion thereof, which extends in a transverse inward direction of the motorcycle 12. The flange 150a and the ridge 150b engage with respective opposite open ends of the first hole 146, thereby securely retaining the grommet 150 on the base 120. The grommet 150 holds the harness 130, which is inserted therein, and prevents water from entering into the winker lamp 10 from between the harness 130 and the surface that defines the insertion hole 152, and from between the surface that defines the first hole 146 and the grommet 150.

The second hole 148 that is defined in the attachment 98 has an open end which is open into the inner space 125 at a position facing the board 126 and the LEDs 124. The second hole 148 serves to vent the inner space 125, equalizing the air pressure in the inner space 125 to the air pressure outside the winker lamp 10 when the air pressure in the inner space 125 is increased by the heat generated when the LEDs 124 emit light. The second hole 148 has an opposite open end that is open at the outer end of the base 120 and which is covered with an air-permeable sheet 154 that absorbs water. The air-permeable sheet 154 prevents water from entering into the inner space 125 through the second hole 148.

The outer lens 122 of the winker lamp 10 is made of a highly transparent synthetic resin. The outer lens 122 that is mounted on the front side of the base 120 serves as a front lens surface of the winker lamp 10. As shown in FIG. 5, the outer lens 122 has an outer profile, which is substantially in agreement with the peripheral edge of the base 120 as viewed in plan. The outer lens 122 is of a convex cross-sectional shape (see FIGS. 6 and 7) and has a rear open end 122a extending along the shape of the front mounting surface 134 of the base 120, which includes the flat area 134a and the slanted area 134b. More specifically, the rear open end 122a of the outer lens 122 snugly engages the front mounting surface 134 of the base 120 with no gaps therebetween, so that the outer lens 122 can be welded to the base 120.

The outer lens 122 is mounted on and joined to the base 120 by a vibration welding process. In the vibration welding process, the outer lens 122 is vibrated parallel to the base 120. Since the outer lens 122 is vibration-welded to the base 120, a hermetic seal is created to prevent rainwater, dust, dirt, etc., from entering into the inner space 125.

The outer lens 122 has an inner surface, which faces toward the inner space 125. The inner surface is cut into an outer lens cut region 122b along a plurality of cut lines that extend horizontally, i.e., along the transverse direction of the motorcycle 12, for thereby vertically dispersing light that is emitted from the LEDs 124. The outer lens 122 has an outer surface, which is not cut, but which is finished to a smooth surface to prevent mud, dirt, etc., from adhering thereto.

The board 126, which is mounted on the base 120, is in the form of an elongate plate extending along the transverse direction of the motorcycle 12, with two LEDs 124 mounted on the mounting surface 126a thereof. The LEDs 124 are electrically connected by a reflow soldering process to an electrically conductive pattern that is printed on the mounting surface 126a.

The board 126 is of a laminated structure having an alternate assembly of layers, which include board members made of, e.g., glass epoxy or phenolic paper, and copper foil, not shown. The board 126 has tubular through holes (not shown) defined therein at positions near the LEDs, and through which the electrically conductive pattern on the mounting surface 126a is electrically connected to an electrically conductive pattern on the reverse side of the board 126. The laminated structure and the through holes of the board 126 are effective to conduct heat generated on the mounting surface 126a at a time when the LEDs 124 emit light to the lower layers of the board 126 and into the space below the board 126. Since the generated heat is dissipated from the board 126, such heat is prevented from being concentrated on and around the LEDs 124. Therefore, the winker lamp 10 exhibits an increased heat radiating capability.

The board 126 has a screw insertion hole 156 defined centrally therein, and protrusive rest insertion holes 158 defined therein at a transverse outer end thereof, and joints between the LEDs 124 and the harness 130. A mounting screw 160 is inserted through the screw insertion hole 156 and is threaded into an internally threaded hole 132a defined in the central protrusive rest 132, which projects from the rear wall 120b of the base 120. The left and right protrusive rests 132 also project from the rear wall 120b of the base 120 and have respective ends inserted into the protrusive rest insertion holes 158, and which are crimped by high-frequency induction heating into welded engagement with the peripheral edges of the protrusive rest insertion holes 158. Since the left and right protrusive rests 132 are securely joined to the board 126 around the protrusive rest insertion holes 158, the number of screws used for fastening the board 126 to the base 120 is reduced, and hence the total number of parts is reduced.

The harness 130, which is electrically connected to the LEDs 124 by the electrically conductive pattern, is connected to the mounting surface 126a of the board 126. The harness 130 has a proximal end thereof electrically connected to the electrical system of the motorcycle 12, and functions to supply electric power to the LEDs 124. A sheath of the harness 130 is preferably, but not necessarily, made of an insulative and flexible synthetic resin, which is resistant to heat generated when the LEDs 124 emit light.

The two LEDs 124 that are mounted on the board 126 comprise LEDs for emitting an amount of light at a color temperature suitable for use as the light source of the winker lamps 10. In particular, since the winker lamps 10 are aimed in a direction in which the motorcycle 12 is to be turned, the winker lamps 10 should preferably comprise devices for emitting high-intensity light with a wide directivity angle, so that light emitted from the winker lamps 10 can be dispersed within a wide illumination range.

As shown in FIG. 6, the inner lens 128, which is disposed in the inner space 125, includes a lens cut region 162 on the front surface of a base portion 161, which extends along the transverse direction of the motorcycle 12, a pair of protruding portions 164 disposed at positions facing the respective LEDs 124 and which project toward the respective LEDs 124, and a roof 166 extending from the base portion 161 near one of the protruding portions 164, along the transverse inward direction of the motorcycle 12.

Figure 7:
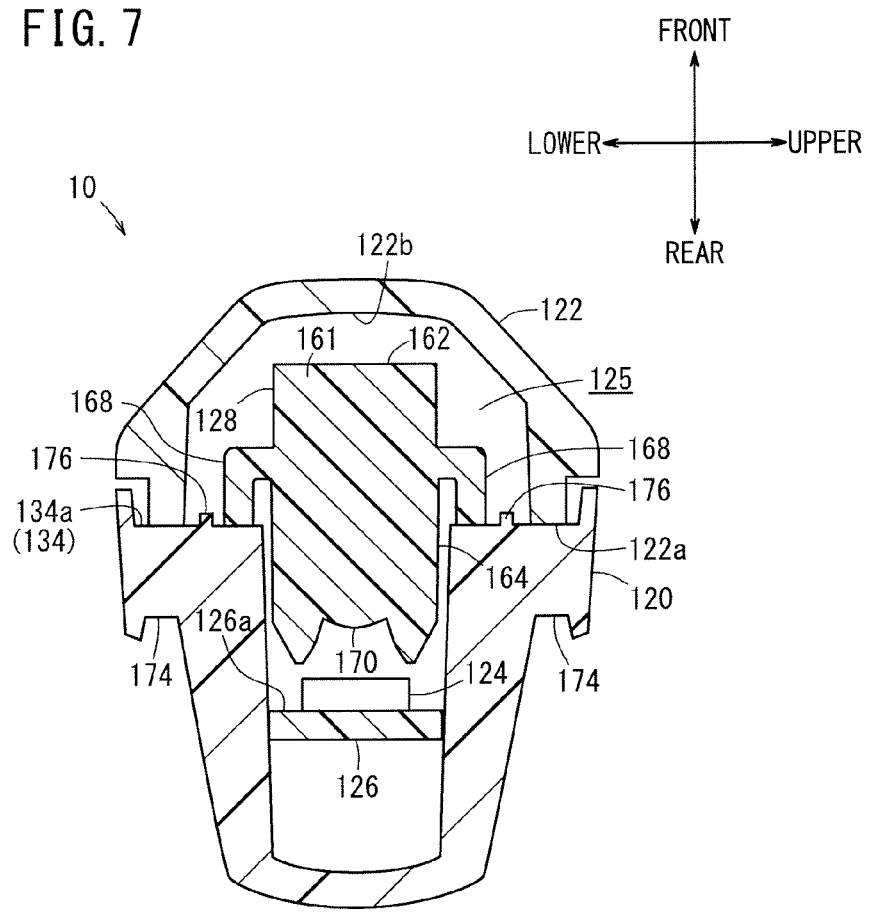
FIG. 7 is a cross-sectional view taken along line VII-VII of FIG. 5.

As shown in FIG. 7, the base portion 161 of the inner lens 128 includes a welding arm 168 on a distal end thereof, i.e., on a transverse outer end thereof, and welding arms 168 on respective upper and lower portions of a proximal end thereof, i.e., on a transverse inner end thereof. The welding arms 168 are joined to the front mounting surface 134 of the base 120 by a vibration welding process. Therefore, the inner lens 128 is supported on the base 120 and is disposed at a given position in the inner space 125.

The lens cut region 162 has a plurality of vertical cut lines spaced along the transverse direction of the motorcycle 12, as shown in FIG. 5. As shown in FIG. 6, the lens cut region 162 has a plurality of arcuate convex lens surfaces disposed between the cut lines. The arcuate convex lens surfaces serve to laterally disperse light emitted from the LEDs 124 and that is transmitted through the inner lens 128. Therefore, the lens cut region 162 functions to disperse light that travels straight from the board 126 toward the outer lens 122, as viewed in front elevation.

The two protruding portions 164 are disposed side by side on the rear surface of the inner lens 128, in respective alignment with the two LEDs 124 mounted on the board 126. As shown in FIG. 6, the protruding portions 164 are substantially part-spindle-shaped, in that the protruding portions 164 are tapered arcuately from the base portion 161, i.e., the lens cut region 162, toward the LEDs 124. The protruding portions 164 have respective crests with cavities 170 defined therein, which are concave toward the base portion 161. The cavities 170 keep the protruding portions 164 spaced from the LEDs 124 by a certain distance, for preventing heat generated upon emission of light from the LEDs 124 from being transmitted to the inner lens 128.

The roof 166 extends from the base portion 161 near one of the protruding portions 164 along the transverse inward direction of the motorcycle 12, i.e., to the right in FIG. 6. The roof 166 is in the shape of a flat plate, which is thinner than the protruding portions 164, with the lens cut region 162 extending over a front surface of the roof 166. The roof 166 has a flat rear surface joined to the base portion 161 near the protruding portion 164, and extending parallel to the board 126, which is disposed behind the roof 166 in facing relation thereto.

Since the inner lens 128 is welded to the base 120 and is supported in a given position in the inner space 125, each of the winker lamps 10 has a relatively wide partial space 172 defined between the rear surface of the roof 166 and the front surface of the board 126. The partial space 172 is surrounded by the protruding portion 164, the roof 166, the board 126, and a transverse inner side wall of the base 120. The harness 130 is placed inside the partial space 172. More specifically, the harness 130 extends from the insertion hole 152 in the grommet 150, which is supported on the transverse inner side wall of the base 120, into the partial space 172 where the harness 130 is connected to the mounting surface 126a of the board 126.

The lens cut region 162 on the front surface of the roof 166 conceals from view the harness 130, which extends into the partial space 172 as viewed in plan. More specifically, although ambient light that enters the winker lamp 10 is reflected by the harness 130, the reflected light is dispersed by the lens cut region 162, and therefore the harness 130 is made less visible and is concealed from view.

The roof 166 extends to such an extent that the transverse inner end thereof is substantially aligned with the flanged end of the grommet 150. Inasmuch as the roof 166 extends to the end of the grommet 150, which projects into the partial space 172, the roof 166 covers the harness 130, which extends from the end of the grommet 150 into the partial space 172, thereby making the harness 130 much less visible.

Figure 8:
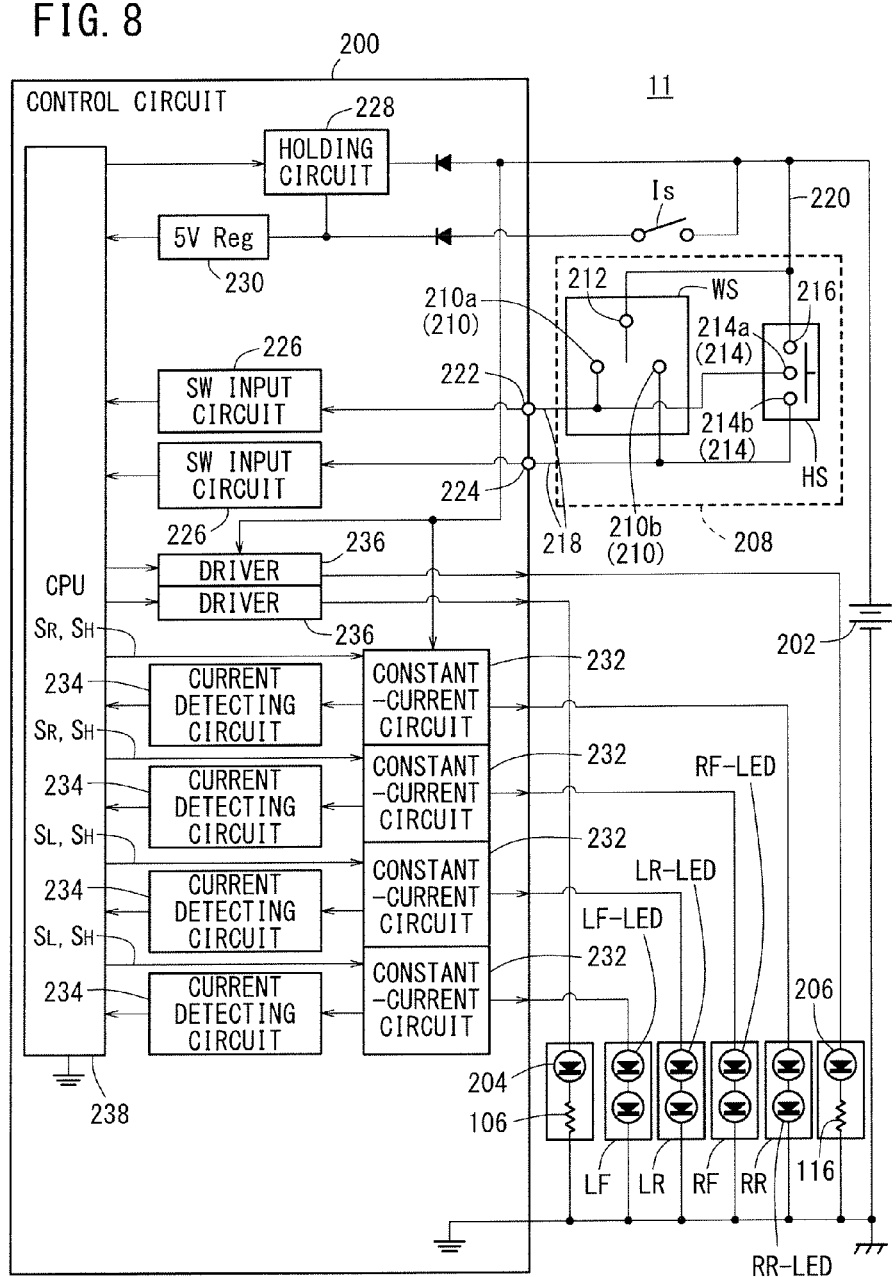
FIG. 8 is a block diagram of a circuit arrangement of the vehicular lighting control system according to the present embodiment.

Details of the vehicular lighting control system 11 according to the present embodiment will be described below. FIG. 8 shows in block form a circuit arrangement of the vehicular lighting control system 11 according to the present embodiment.

The vehicular lighting control system 11 has a total of four winker lamps, i.e., the left and right front winker lamps 10 and the left and right rear winker lamps 73. In order to distinguish the four winker lamps from each other in the circuit arrangement, in FIG. 8, the left front winker lamp is denoted by LF, the left rear winker lamp is denoted by LR, the right front winker lamp is denoted by RF, and the right rear winker lamp is denoted by RR.

As shown in FIG. 8, the vehicular lighting control system 11 includes the winker switch WS and the hazard switch HS for blinking the winker lamps LF, LR, RF, RR, and also has a control circuit (controller) 200 for controlling blinking of the winker lamps LF, LR, RF, RR. The control circuit 200 controls the winker mode (left winker mode or right winker mode) to blink either the left winker lamps LF, LR or the right winker lamps RF, RR based on a signal from the winker switch WS, which is turned on by the rider, and also controls the hazard mode to blink both the left winker lamps LF, LR and the right winker lamps RF, RR simultaneously based on a signal from the hazard switch HS, which is turned on by the rider.

The ignition switch of the motorcycles 12 is denoted by IS. The ignition switch IS, the winker switch WS, and the hazard switch HS are connected to respective input ports of the control circuit 200. The ignition switch IS, the winker switch WS, and the hazard switch HS have respective high-side terminals connected to the positive terminal of a battery (power supply) 202. In other words, the ignition switch IS, the winker switch WS, and the hazard switch HS are connected between the control circuit 200 and the battery 202. Therefore, the control circuit 200 accurately judges whether or not the ignition switch IS and the winker switch WS are turned on by detecting an input voltage (signal) that is applied from the battery 202 when the winker switch WS and the hazard switch HS are turned on.

The control circuit 200 has output ports connected to LED arrays LF-LED, LR-LED, RF-LED, RR-LED, which serve as light sources of the winker lamps LF, LR, RF, RR, an LED 204 as a light source of the left winker indicator 106, and an LED 206 as a light source of the right winker indicator 116. The LED arrays LF-LED, LR-LED, RF-LED, RR-LED, the LED 204, and the LED 206 have cathode terminals thereof connected to ground, together with the negative terminal of the battery 202.

The ignition switch IS is a switch for starting and stopping the engine 22, which is connected by wires between the control circuit 200 and the battery 202. The ignition switch IS may comprise a key switch. When the ignition switch IS is turned on, e.g., when the key inserted therein is turned, the battery 202 is connected to the control circuit 200 for supplying electric power to the control circuit 200. More specifically, when the ignition switch IS is turned on, the battery 202 applies a voltage of 5 V, for example, to the control circuit 200.

The winker switch WS and the hazard switch HS each comprises a selector switch, which completes or breaks an electric circuit when the winker switch WS or the hazard switch HS is mechanically turned on or off by the rider. The winker switch WS and the hazard switch HS are supported on the handle switch case 41 of the switch unit 208 on the left handlebar 39 (see FIG. 3). The winker switch WS and the hazard switch HS are connected in parallel within the switch unit 208.

More specifically, the winker switch WS has two output contacts 210 (left switch contact 210a and right switch contact 210b), which are connected to the control circuit 200, and an input contact 212, which is connected to the battery 202. The output contacts 210 and the input contact 212 are included within the switch unit 208. The left switch contact 210a serves as a connection terminal for instructing the left winker lamps LF, LR to blink, whereas the right switch contact 210b serves as a connection terminal for instructing the right winker lamps RF, RR to blink. When the rider tilts a trigger lever connected to the input contact 212 in one or the other direction, the input contact 212 becomes connected to the left switch contact 210a or the right switch contact 210b, whereupon the left switch contact 210a or the right switch contact 210b, which is connected to the input contact 212, applies the input voltage from the battery 202 to the control circuit 200.

The hazard switch HS has two output contacts 214 (left switch contact 214a and right switch contact 214b) connected to the control circuit 200, and an input contact 216 connected to the battery 202. The output contacts 214 and the input contact 216 are included within the switch unit 208. The output contacts 214 and the input contact 216 are connected in parallel with the output contacts 210 and the input contact 212 of the winker switch WS. The hazard switch HS may comprise a three-contact switch, which mechanically connects three contacts simultaneously when a mechanical button (not shown), such as a pushbutton, is pressed by the rider. The hazard switch HS, which is constructed in the foregoing manner, is simple in structure and inexpensive to manufacture. When the rider turns on the hazard switch HS, the three contacts are connected together simultaneously, i.e., the input contact 216 is connected to both the left switch contact 214a and the right switch contact 214b, which simultaneously apply the input voltage from the battery 202 to the control circuit 200.

The left switch contact 210a of the winker switch WS and the left switch contact 214a of the hazard switch HS are connected to a harness 218, which is connected to the control circuit 200. The right switch contact 210b of the winker switch WS and the right switch contact 214b of the hazard switch HS are connected to another harness 218, which is connected to the control circuit 200. The input contact 212 of the winker switch WS and the input contact 216 of the hazard switch HS are connected to a harness 220, which is connected to the battery 202. With the winker switch WS and the hazard switch HS being connected in parallel, the harnesses 218 are connected to the harness 220 when the winker switch WS and the hazard switch HS are turned on. In the vehicular lighting control system 11, the battery 202 can thus be connected to the control circuit 200 by the harnesses 218, 220, and the number of harnesses used is smaller than if the winker switch WS and the hazard switch HS were connected separately between the battery 202 and the control circuit 200.

The LEDs 124 (see FIG. 6) of the winker lamp 10 are used as each of the LED arrays LF-LED, LR-LED, RF-LED, RR-LED, which serve as light sources of the winker lamps LF, LR, RF, RR that are connected to the output ports of the control circuit 200. In the present embodiment, each of the light sources comprises two series-connected LEDs 124. The LED arrays LF-LED, LR-LED, RF-LED, RR-LED are energized to emit light when supplied with electric current at given times from the control circuit 200. The meter unit 90 includes an instrument panel 90a (see FIG. 3), which supports thereon the LEDs 204, 206 of the left winker indicator 106 and the right winker indicator 116. The LEDs 204, 206 may be LEDs that emit a smaller amount of light than the LEDs 124.

As shown in FIG. 8, the control circuit 200 has a left switch input port 222, a right switch input port 224, two SW input circuits (input voltage determiners) 226, a holding circuit (holder) 228, a 5V regulator 230, four constant-current circuits 232, four current detecting circuits 234, two indicator drivers 236, and a CPU (judging means) 238.

The left switch input port 222 and the right switch input port 224 function as parts of the input ports of the control circuit 200. The left switch input port 222 has a high-side terminal, which is connected to the left switch contacts 210a, 214a of the winker switch WS and the hazard switch HS, and a low-side terminal, which is connected to one of the SW input circuits 226. Therefore, the left switch input port 222 introduces an input voltage into the control circuit 200, which is delivered from the left switch contacts 210a, 214a.

The right switch input port 224 has a high-side terminal, which is connected to the right switch contacts 210b, 214b of the winker switch WS and the hazard switch HS, and a low-side terminal, which is connected to the other of the SW input circuits 226. Therefore, the right switch input port 224 introduces an input voltage into the control circuit 200, which is delivered from the right switch contacts 210b, 214b.

Figure 9:
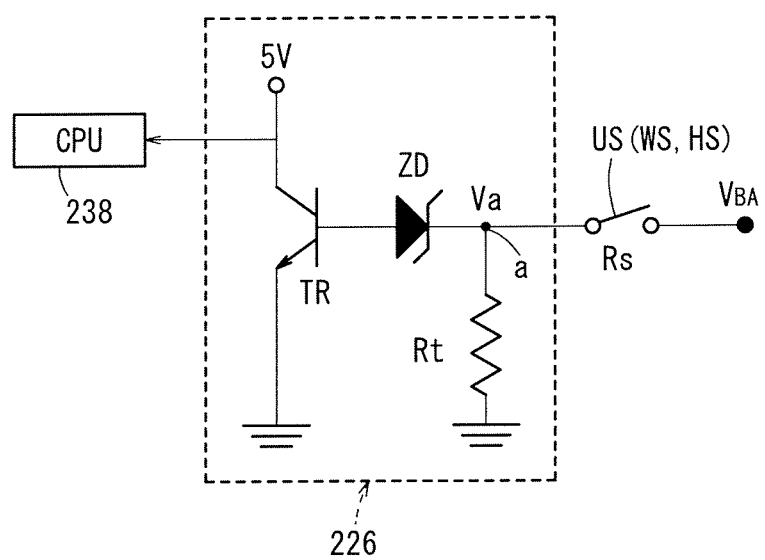
FIG. 9 is a circuit diagram of a SW input circuit of the vehicular lighting control system shown in FIG. 8.

FIG. 9 is a circuit diagram of each of the SW input circuits 226 of the vehicular lighting control system 11 shown in FIG. 8. As shown in FIG. 9, the SW input circuit 226 is connected between the left switch input port 222 or the right switch input port 224 and the CPU 238, and comprises a circuit arrangement for determining the voltage value of an input voltage that is delivered from the left switch input port 222 or the right switch input port 224.

The control circuit 200 normally receives an input voltage that is applied when the winker switch WS or the hazard switch HS is turned on. In addition, when a leakage current is generated in the switch unit 208, the control circuit 200 may also receive a voltage based on the leakage current. A leakage current is generated in the switch unit 208, for example, if rain water or the like enters the winker switch WS or the hazard switch HS, which is exposed to the external environment, thereby electrically connecting the input contact 212 or 216 to the output contact 210 or 214. The SW input circuit 226 functions to block a voltage that is based on such a leakage current, and to detect only an input voltage applied when the winker switch WS or the hazard switch HS is turned on, so as to output a predetermined signal (voltage value) to the CPU 238. The SW input circuit 226, which is connected to the left switch input port 222, will be described in detail below.

As shown in FIG. 9, the SW input circuit 226 includes a resistor Rt, a zener diode ZD, and a transistor TR. The resistor Rt has one end connected at a junction a to the left switch input port 222, and the other end connected to ground. The resistor Rt is set to an appropriate resistance value depending on the voltage across the battery 202, the resistance value Rs of a switch US at the time a leakage current is generated, and the breakdown voltage value of the zener diode ZD. The switch US collectively represents the winker switch WS and the hazard switch HS, and has the resistance value Rs when a leakage current is generated in the switch US.

The zener diode ZD has a cathode terminal, which is connected to the junction a, and an anode terminal, which is connected to the base terminal of the transistor TR. The zener diode ZD should preferably have a breakdown voltage, which is set to a value in the range from 3.7 V to 6 V, depending on the voltage value (8 V to 16 V) across the battery 202.

The transistor TR may be an NPN bipolar transistor having a collector terminal connected to a 5V power supply, such as the output terminal of a later-described 5V regulator 230, and an emitter terminal connected to ground.

A voltage $V_a$ at the junction a is indicated by $V_a = Rt/(Rt+Rs) \cdot V_{BA}$ where $V_{BA}$ represents the voltage across the battery 202. When the winker switch WS or the hazard switch HS is turned on, the resistance value Rs becomes essentially nil, and the voltage $V_a$ is of a value that is close to the voltage $V_{BA}$ in excess of the breakdown voltage value of the zener diode ZD. As a result, the zener diode ZD outputs a current as a base current from the anode terminal thereof to the base terminal of the transistor TR. A predetermined voltage of 5 V is applied from the 5V power supply to the collector-to-emitter junction of the transistor TR, thereby sending a signal representing a voltage value of 5 V to the CPU 238.

If a leakage current is generated in the switch US, then the resistance value Rs increases, and the voltage $V_a$ becomes a value that is sufficiently smaller than the breakdown voltage of the zener diode ZD. Accordingly, the zener diode ZD blocks the leakage current.

Therefore, the SW input circuit 226 is capable of accurately distinguishing between turning-on of the winker switch WS or the hazard switch HS, and the leakage current. Furthermore, since the SW input circuit 226 is constituted by the resistor Rt, the zener diode ZD, and the transistor TR, the SW input circuit 226 is of a simple structure, is small in size, and is low in cost.

As shown in FIG. 8, the holding circuit 228 has input terminals connected respectively to the CPU 238 and the battery 202, and an output terminal connected to the 5V regulator 230. The holding circuit 228 functions to maintain the CPU 238 and the battery 202 in connection with each other, based on the hazard mode of the winker lamps LF, LR, RF, RR as judged by the CPU 238. More specifically, when the winker lamps LF, LR, RF, RR operate in the hazard mode, the CPU 238 inputs an ON signal to the holding circuit 228, and the holding circuit 228 keeps the CPU 238 and the battery 202 connected to each other, as long as the ON signal is input to the holding circuit 228.

Consequently, even if the ignition switch IS is turned off, i.e., even if the engine 22 is stopped, when the winker lamps LF, LR, RF, RR are operating in the hazard mode, the holding circuit 228 enables the voltage from the battery 202 to be applied continuously to the CPU 238, in order to keep the hazard mode operational until the hazard switch HS has been turned off by the rider. The CPU 238 thus operates to keep the winker lamps LF, LR, RF, RR operating in the hazard mode, thereby making the motorcycle 12 highly visible and noticeable even when the engine 22 is at rest.

When the hazard switch HS is turned off by the rider in order to stop the winker lamps LF, LR, RF, RR from operating in the hazard mode, the holding circuit 228 disconnects the battery 202 and the CPU 238 from each other, thereby stopping supply of voltage from the battery 202 to the CPU 238. Since supply of voltage from the battery 202 to the CPU 238 remains stopped unless the ignition switch IS is turned on again, the winker lamps LF, LR, RF, RR are prevented from becoming energized (i.e., from blinking), even if the winker switch WS or the hazard switch HS is turned on after the engine 22 has been stopped. Therefore, the winker lamps LF, LR, RF, RR will not operate in the hazard mode if a third party, for example, turns on the hazard switch HS.

The 5V regulator 230 has an input terminal, which is connected to the ignition switch IS and to the output terminal of the holding circuit 228, and an output terminal, which is connected to the CPU 238. The 5V regulator 230 has a function to decrease the voltage from the battery 202 to a drive voltage of 5 V, for thereby energizing the CPU 238 and stably supplying the drive voltage of 5 V to the CPU 238.

The constant-current circuits 232 supply a prescribed amount of current to the winker lamps LF, LR, RF, RR, and are associated respectively with the winker lamps LF, LR, RF, RR. The constant-current circuits 232 have respective input terminals, which are connected to the CPU 238 and to the battery 202, and respective output terminals, which are connected to the respective current detecting circuits 234 and to the respective LED arrays LF-LED, LR-LED, RF-LED, RR-LED of the winker lamps LF, LR, RF, RR.

The constant-current circuits 232 receive winker blinking signals $S_L$, $S_R$, $S_H$ sent from the CPU 238, connect the battery 202 and the LED arrays LF-LED, LR-LED, RF-LED, RR-LED to each other, and supply prescribed currents from the battery 202 to the LED arrays LF-LED, LR-LED, RF-LED, RR-LED to enable the LED arrays LF-LED, LR-LED, RF-LED, RR-LED to emit light.

Among the winker lamps LF, LR, RF, RR, the winker lamps LF, RF also serve as positioning lights, which emit a smaller amount of light than when the winker lamps blink to produce direction indicating signals while the motorcycle 12 is being driven. The constant-current circuits 232, which are connected to the winker lamps LF, RF, include respective circuits for supplying a constant current for the positioning lights from the battery 202.

The current detecting circuits 234 have respective input terminals, which are connected to the constant-current circuits 232, and respective output terminals, which are connected to the CPU 238. The current detecting circuits 234, which are connected in this manner, supply the CPU 238 with feedback information concerning operation of the constant-current circuits 232. More specifically, in the event of a disconnection between the constant-current circuits 232 and the LED arrays LF-LED, LR-LED, RF-LED, RR-LED, no current flows from the constant-current circuits 232, even if the constant-current circuits 232 receive the blinking signals $S_L$, $S_R$, $S_H$ from the CPU 238. At this time, the current detecting circuits 234, which detect current values of the constant-current circuits 232, confirm that a disconnection has occurred between the constant-current circuits 232 and the LED arrays LF-LED, LR-LED, RF-LED, RR-LED. Since the current detecting circuits 234 are connected respectively to the constant-current circuits 232, the current detecting circuits 234 can confirm respective disconnections that may occur with respect to the constant-current circuits 232. Consequently, the control circuit 200 can detect such disconnections with increased accuracy.

The indicator drivers 236, which supply a prescribed amount of current to the LEDs 204, 206 of the left winker indicator 106 and the right winker indicator 116, are connected respectively to the LEDs 204, 206. The indicator drivers 236 have respective input terminals, which are connected to the CPU 238, and respective output terminals, which are connected to the LEDs 204, 206 of the left winker indicator 106 and the right winker indicator 116. The indicator drivers 236 receive the winker blinking signals $S_L$, $S_R$, $S_H$ from the CPU 238, and supply a prescribed current from the battery 202 to the LEDs 204, 206 so as to enable the LEDs 204, 206 to emit light.

The CPU 238 comprises a microprocessor (microcomputer) of known nature for performing processing sequences therein, the microprocessor having input and output interfaces. The CPU 238 may be combined with an ECU (Engine Control Unit), not shown, for controlling the engine 22.

The CPU 238 judges whether or not the winker switch WS and the hazard switch HS are turned on or off, and controls light emission from the LED arrays LF-LED, LR-LED, RF-LED, RR-LED of the winker lamps LF, LR, RF, RR, and the LEDs 204, 206 of the left winker indicator 106 and the right winker indicator 116, based on such a judgment. The CPU 238 stores therein a judging program, not shown, for judging whether or not the winker switch WS and the hazard switch HS are turned on or off, and performs a judging process based on such a judging program.

The CPU 238 has a register (not shown) of three or more bits for managing energization of the winker lamps LF, LR, RF, RR in each cycle of operation. The winker modes (left winker mode and right winker mode) and the hazard mode of the winker lamps LF, LR, RF, RR are controlled by the CPU 238 based on flags (left winker mode flag, right winker mode flag, and hazard mode flag), which are set in the register by the CPU 238.

For example, if the CPU 238 sets the left winker mode flag to 1 (true) in the register, then the CPU 238 outputs winker blinking signals $S_L$ to the constant-current circuits 232 for blinking the left winker lamps LF, LR, and if the CPU 238 sets the right winker mode flag to 1 in the register, then the CPU 238 outputs winker blinking signals $S_R$ to the constant-current circuits 232 for blinking the right winker lamps LF, LR. If the CPU 238 sets the hazard mode flag to 1 in the register, then the CPU 238 outputs winker blinking signals $S_H$ to the constant-current circuits 232 for blinking the winker lamps LF, LR, RF, RR.

The winker blinking signals $S_L$, $S_R$, $S_H$ are pulse signals that have a repetitive pattern of alternate high and low levels at a prescribed cyclic period. The winker blinking signals $S_L$, $S_R$, $S_H$ are sent to the constant-current circuits 232 depending on the left winker mode, the right winker mode, and the hazard mode, which are determined by the judging process. When the winker blinking signals $S_L$, $S_R$, $S_H$ are of a high level, the constant-current circuits 232 connect the battery 202 to the LED arrays LF-LED, LR-LED, RF-LED, RR-LED. The constant-current circuits 232 supply current from the battery 202 at a suitable time to desired ones of the LED arrays LF-LED, LR-LED, RF-LED, RR-LED, thereby blinking corresponding ones of the winker lamps LF, LR, RF, RR. Since the CPU 238 blinks the winker lamps LF, LR, RF, RR based on the different flags, which are set respectively for the left winker mode, the right winker mode, and the hazard mode, the timing at which the winker lamps LF, LR, RF, RR are blinked in the left winker mode, the right winker mode, and the hazard mode can be changed based on the flags, thereby enabling the winker lamps LF, LR, RF, RR to be blinked with high freedom.

The vehicular lighting control system 11 according to the embodiment of the present invention is basically constructed as described above. Operations of the vehicular lighting control system 11 will be described below.

Figure 10:
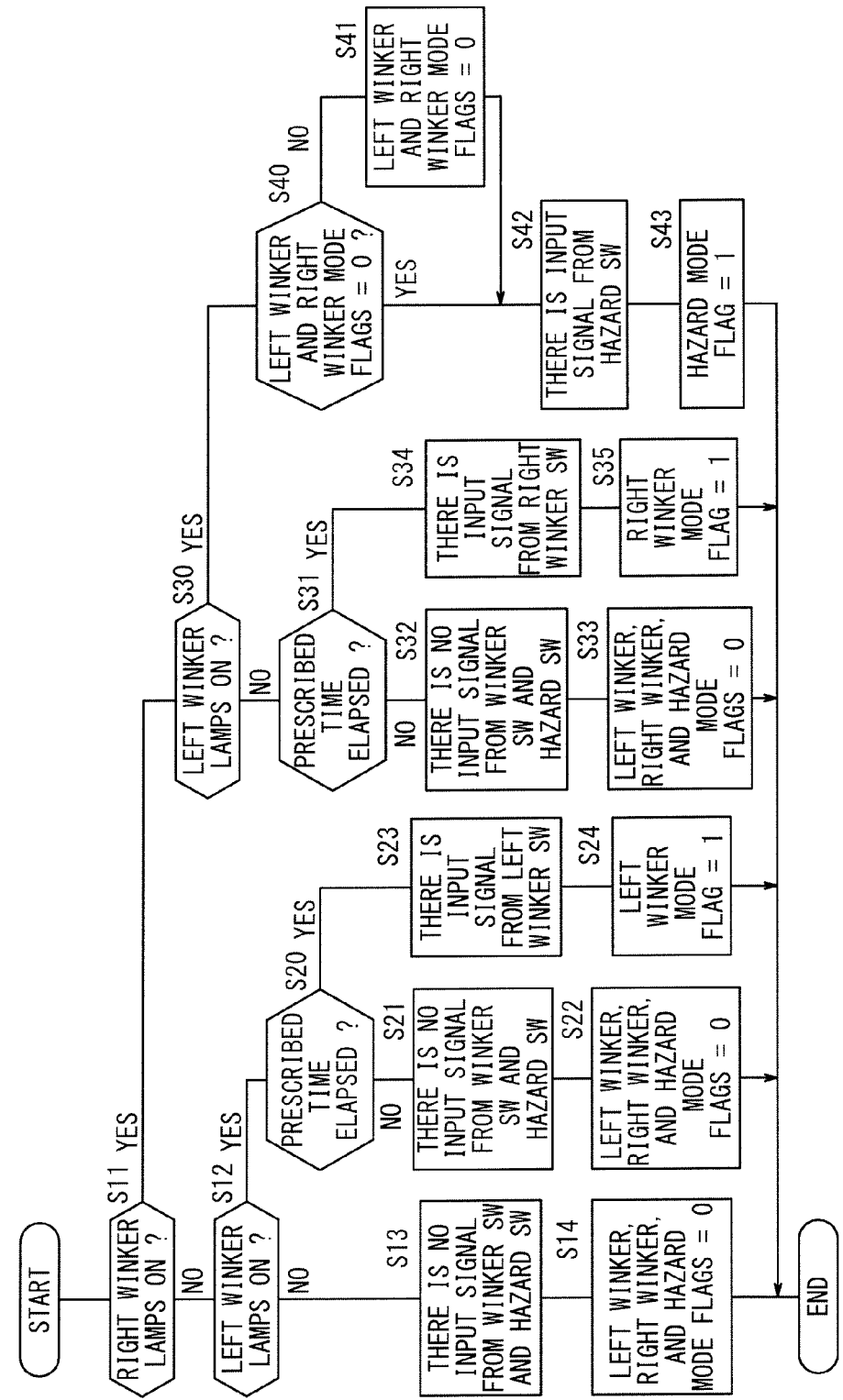
FIG. 10 is a flowchart of a discriminating sequence of a CPU in the vehicular lighting control system shown in FIG. 8.

FIG. 10 is a flowchart of a judging process performed by the CPU 238 of the vehicular lighting control system 11 shown in FIG. 8. According to the judging process shown in FIG. 10, when the ignition switch IS is turned on and the CPU 238 is energized, the vehicular lighting control system 11 determines whether or not there are input signals from the winker switch WS and the hazard switch HS.

First, a normal driving mode, in which there are no input signals from the winker switch WS and the hazard switch HS, will be described below. In step S11, the CPU 238 determines whether or not there is an input signal for blinking the right winker lamps RF, RR from the right switch input port 224. Such an input signal represents a prescribed voltage value of 5 V from the SW input circuit 226, which detects a voltage input to the right switch input port 224. Since no input signal is detected in step S11 in the normal driving mode, control proceeds from step S11 to step S12.

In step S12, the CPU 238 determines whether or not there is an input signal for blinking the left winker lamps LF, LR from the left switch input port 222. Since no input signal is detected in step S12 in the normal driving mode, control proceeds from step S12 to step S13.

In step S13, the CPU 238 determines that there are no input signals from the winker switch WS and the hazard switch HS.

Based on the decision in step S13, the CPU 238 resets the left winker mode flag, the right winker mode flag, and the hazard mode flag to 0 (false) in step S14. Thus, the winker lamps LF, LR, RF, RR do not operate in the left winker mode, the right winker mode, and the hazard mode. When the above judging cycle is finished, the CPU 238 starts a new judging cycle.

A left winker blinking mode, in which the winker switch WS is operated to turn on the left winker LF, LR, will be described below. In step S11, after the CPU 238 has determined that there is no input signal for blinking the right winker RF, RR from the right switch input port 224, control proceeds to step S12, in which the CPU 238 determines that there is an input signal for blinking the left winker lamps LF, LR from the left switch input port 222.

Then, the CPU 238 starts measuring time with a built-in timer, and determines whether or not a prescribed time has elapsed in step S20. If the CPU 238 determines that the prescribed time has not elapsed, then in step S21, the CPU 238 decides that there are no input signals from the winker switch WS and the hazard switch HS.

Based on the decision in step S21, the CPU 238 resets the left winker mode flag, the right winker mode flag, and the hazard mode flag to 0 in step S22. Therefore, the winker lamps LF, LR, RF, RR do not operate in the left winker mode, the right winker mode, and the hazard mode. When the above judging cycle is finished, the CPU 238 starts a new judging cycle.

After step S12, if the CPU 238 determines that the prescribed time has elapsed in step S20, then in step S23, the CPU 238 determines that the winker switch WS has been operated to turn on the left winker LF, LR.

According to the present embodiment, therefore, even if the winker switch WS is operated, the CPU 238 does not turn on the left winker lamps LF, LR unless the prescribed time has elapsed. Consequently, the CPU 238 blinks the winker lamps LF, LR, RF, RR only after the CPU 238 has determined for certain that there is an input signal from the winker switch WS. The winker lamps LF, LR, RF, RR are thus prevented from being energized in error.

After step S23, the CPU 238 sets the left winker mode flag to 1 in the register in step S24 based on the decision made in step S23, and outputs the winker blinking signal $S_L$ to the corresponding constant-current circuits 232, which are connected respectively to the left winker lamps LF, LR. The left winker lamps LF, LR are supplied with current from the corresponding constant-current circuits 232 in the left winker mode, thereby blinking the LED arrays LF-LED, LR-LED.

A right winker blinking mode, in which the winker switch WS is operated to turn on the right winker RF, RR will be described below. In step S11, the CPU 238 determines that there is an input signal for blinking the right winker lamps RF, RR from the right switch input port 224.

Control proceeds from step S11 to step S30, during which the CPU 238 determines that there is no input signal for blinking the left winker lamps LF, LR from the left switch input port 222. Since there is no input signal for blinking the left winker lamps LF, LR from the left switch input port 222, and since the right winker RF, RR are being blinked at this time, control proceeds from step S30 to step S31.

In step S31, the CPU 238 starts measuring time with the built-in timer, and judges whether or not a prescribed time has elapsed. If the CPU 238 decides that the prescribed time has not elapsed, then in step S32, the CPU 238 decides that there are no input signals from the winker switch WS and the hazard switch HS.

Based on the decision made in step S32, in step S33, the CPU 238 resets the left winker mode flag, the right winker mode flag, and the hazard mode flag to 0. Inasmuch as the left winker mode flag, the right winker mode flag, and the hazard mode flag are reset to 0, the winker lamps LF, LR, RF, RR do not operate in the left winker mode, the right winker mode, and the hazard mode. When the above judging cycle is finished, the CPU 238 starts a new judging cycle.

After step S30, if the CPU 238 determines that the prescribed time has elapsed in step S31, then in step S34, the CPU 238 determines that the winker switch WS has been operated in order to turn on the right winker RF, RR.

Therefore, the CPU 238 does not turn on the right winker lamps RF, RR until the prescribed time has elapsed. Consequently, the winker lamps LF, LR, RF, RR are prevented from being energized in error.

After step S34, the CPU 238 sets the right winker mode flag to 1 in the register in step S35, based on the decision made in step S34, and outputs the winker blinking signal $S_R$ to the corresponding constant-current circuits 232, which are connected to the respective right winker lamps RF, RR. The right winker lamps RF, RR are supplied with currents from the corresponding constant-current circuits 232 in the right winker mode, thereby blinking the LED arrays RF-LED, RR-LED.

A hazard blinking mode, in which the hazard switch HS is operated to turn on the winker lamps LF, LR, RF, RR, will be described below. As described above, the hazard switch HS has the three contacts, i.e., the left switch contact 214a, the right switch contact 214b, and the input contact 216, which are connected to each other simultaneously when the mechanical button of the hazard switch HS is pressed. When the mechanical button is pressed, the left switch contact 214a, the right switch contact 214b, and the input contact 216 may possibly be connected at slightly different times, thereby applying voltages via the switch input ports 222, 224 to the control circuit 200 at different times, i.e., asynchronously. Therefore, although the hazard switch HS is turned on, one of the winker lamps may be blinked based on an earlier one of the voltages, which occurs at a time earlier than when the other winker lamps are blinked.

The judging process according to the present embodiment includes a processing sequence for accurately deciding that the hazard switch HS has been turned on, regardless of input voltages that are applied asynchronously.

If the CPU 238 determines in step S11 that there is an input signal for blinking the right winker lamps RF, RR from the right switch input port 224, then control proceeds from step S11 to step S30, as described above. In step S30, the CPU 238 determines whether or not there is an input signal for blinking the left winker lamps LF, LR from the left switch input port 222.

Until the CPU 238 determines in step S30 that there is an input signal for blinking the left winker lamps LF, LR from the left switch input port 222, control goes through steps S31, S32, S33 and back to step S11, so as to repeat the above sequence until the prescribed time has elapsed. If there is an input signal for blinking the left winker lamps LF, LR during the prescribed time, then the CPU 238 performs the sequence of steps S40 through S43, which differs from the above hazard blinking mode.

In step S11, if the CPU 238 determines that there is no input signal for blinking the right winker lamps RF, RR from the right switch input port 224, then control proceeds from step S11 to step S12, as described above. In step S12, the CPU 238 determines whether or not there is an input signal for blinking the left winker lamps LF, LR from the left switch input port 222. In step S12, if the CPU 238 determines that there is an input signal for blinking the left winker lamps LF, LR from the left switch input port 222, then control proceeds through steps S20, S21, S22 and back to step S11, so as to repeat the above sequence until a prescribed time has elapsed. If there is an input signal for blinking the right winker lamps LF, LR during the prescribed time, then the CPU 238 performs step S30, and then carries out the sequence of steps S40 through S43, which differs from the above hazard blinking mode.

In step S40, the CPU 238 judges whether or not the left winker mode flag and the right winker mode flag are 0. If either one of the left winker mode flag and the right winker mode flag is 1, then control proceeds from step S40 to step S41. If both of the left winker mode flag and the right winker mode flag are 0, then control proceeds from step S40 to step S42.

The fact that either one of the left winker mode flag and the right winker mode flag is 1 implies that either the left winker lamps LF, LR or the right winker lamps RF, RR are blinking. When the hazard switch HS is turned on, in step S41, both the left winker mode flag and the right winker mode flag are reset to 0, thereby canceling blinking of the winker lamps. By resetting the left winker mode flag and the right winker mode flag to 0, the CPU 238 energizes the winker lamps to blink in the hazard mode, which is considered more urgent than blinking the winker lamps in the winker mode.

Thereafter, in step S42, the CPU 238 determines that the hazard switch HS has been turned on.

Based on the decision made in step S42, the CPU 238 sets the hazard mode flag to 1 in step S43, and outputs the winker blinking signal $S_H$ to the corresponding constant-current circuits 232, i.e., to all of the constant-current circuits 232. The winker lamps LF, LR, RF, RR are supplied with currents from the respective constant-current circuits 232 in the hazard mode, thereby blinking the respective LED arrays LF-LED, LR-LED, RF-LED, RR-LED.

As described above, when the hazard switch HS is turned on, even if input signals are applied at different times to the control circuit 200 as a result of pressing a mechanical button, such as a pushbutton, for example, the control circuit 200 can detect an earlier input signal from one of the switch input ports 222, 224, and thereafter can detect another input signal from the other switch input port within a prescribed time from the earlier input signal, thereby determining that the hazard switch HS has been turned on. If the control circuit 200 does not detect an input signal from the other switch input port within the prescribed time from the earlier input signal, then the control circuit 200 determines that the winker switch WS has been turned on. Consequently, the control circuit 200 can accurately distinguish between turning-on of the winker switch WS and turning-on of the hazard switch HS. The winker lamps are effectively prevented from being energized in error due to a leakage current, while the switch unit 208 is of a relatively simple circuit arrangement, because the winker switch WS and the hazard switch HS are connected by common wires, resulting in a reduced number of harnesses required to interconnect the switches WS, HS and the control circuit 200.

Inasmuch as the SW input circuits 226 are capable of accurately distinguishing between voltages applied when the winker switch WS and the hazard switch HS are turned on, and voltages applied due to leakage currents, the winker switch WS and the hazard switch HS can be mounted on the handlebar 39 without the need for complex water-resistance structures for the winker switch WS and the hazard switch HS.

Although a certain preferred embodiment of the present invention has been shown and described in detail, it should be understood that various changes and modifications may be made to the embodiment without departing from the scope of the invention as set forth in the appended claims.

The invention claimed is:

1. A lighting control system for use on a vehicle, the vehicle comprising a motorcycle having a front wheel steerable by handle assembly, comprising:
   a winker switch and a hazard switch configured to be turned on and off selectively by a driver of the vehicle; and
   a controller, which operates in a winker mode for blinking either left or right lighting bodies having light-emitting diodes mounted on left and right sides of the vehicle when the winker switch is turned on, and a hazard mode for blinking the left and right lighting bodies simultaneously when the hazard switch is turned on,
   wherein the controller comprises:
      a left switch input port for supplying signals representative of operation of the left lighting bodies, and a right switch input port for supplying signals representative of operation of the right lighting bodies the winker switch and the hazard switch being connected through common wires to the left switch input port and the right switch input port, the winker switch and the hazard switch being connected between the controller and a power supply, the winker switch and the hazard switch being disposed on a switch case provided proximate to the handle assembly, the hazard switch comprising a three-contact switch, three contacts of which are connected to the left switch input port, the right switch input port, and the power supply, respectively, when the hazard switch is turned on; and
      judging means for determining an input signal supplied from the left switch input port and an input signal supplied from the right switch input port when the winker switch is turned on or when the hazard switch is turned on, the judging means being connected between the winker and hazard switched and the left and right lighting bodies,
   wherein the judging means determines that the hazard switch has been turned on when the judging means detects an input signal from either one of the left switch input port and the right switch input port and then, within a prescribed time, detects an input signal from the other of the left switch input port and the right switch input port, and further determines that the winker switch has been turned on when the judging means does not detect, within the prescribed time, an input signal from the other of the left switch input port and the right switch input port, and
   wherein the controller supplies the light-emitting diodes with electric power based on the judgment by the judging means that the hazard switch and the winker switch are turned on.

2. The lighting control system according to claim 1, wherein the winker switch and the hazard switch are connected in parallel.

3. The lighting control system according to claim 1, wherein the controller switches from the winker mode to the hazard mode when the judging means determines that the hazard switch has been turned on during the winker mode.

4. The lighting control system according to claim 1, wherein the judging means determines that the winker switch and the hazard switch are not turned on until the prescribed time has elapsed.

5. The lighting control system according to claim 1, wherein the controller includes a holder for continuously supplying electric power, to thereby perform the hazard mode until the hazard switch has been turned off, even if an ignition switch for operating an engine of the vehicle is turned off during the hazard mode; and
   wherein the holder stops supplying electric power until the ignition switch, which has been turned off, is turned on again after the hazard switch has been turned off.

6. The lighting control system according to claim 1, wherein the controller includes a voltage determiner for determining a voltage applied when the winker switch or the hazard switch is turned on, and for determining a voltage generated due to a leakage current, the voltage determiner being connected between the left switch input port and the right switch input port, and the judging means.

* * * * *